US010833302B2

(12) United States Patent
Nguyen

(10) Patent No.: US 10,833,302 B2
(45) Date of Patent: Nov. 10, 2020

(54) MODULAR BATTERY POWER STORAGE AND GENERATION SYSTEM

(71) Applicant: Benjamin Ngoc Nguyen, Conway, AR (US)

(72) Inventor: Benjamin Ngoc Nguyen, Conway, AR (US)

(*) Notice: Subject to any disclaimer, the term of this patent is extended or adjusted under 35 U.S.C. 154(b) by 334 days.

(21) Appl. No.: 16/027,840

(22) Filed: Jul. 5, 2018

(65) Prior Publication Data

US 2019/0319231 A1 Oct. 17, 2019

Related U.S. Application Data

(60) Provisional application No. 62/656,384, filed on Apr. 12, 2018.

(51) Int. Cl.
 *H01M 2/10* (2006.01)
 *H01M 2/20* (2006.01)

(52) U.S. Cl.
 CPC ......... *H01M 2/1077* (2013.01); *H01M 2/206* (2013.01); *H01M 2220/10* (2013.01)

(58) Field of Classification Search
 CPC ............ H01M 2/1077; H01M 2/206; H01M 2220/10; H01M 2/06; H01M 2/30; Y02E 70/30; Y02E 60/122; H02J 9/066; H02J 9/061; H02J 15/00; H02J 3/32; H02J 7/34; H02J 1/10
 USPC ..................................... 361/729; 307/64, 66
 See application file for complete search history.

(56) References Cited

U.S. PATENT DOCUMENTS

| 4,957,829 | A | 9/1990 | Holl |
|---|---|---|---|
| 6,796,382 | B2 | 9/2004 | Kaimart |
| 7,147,061 | B2 | 12/2006 | Tsutaoka et al. |
| 2007/0090788 | A1 | 4/2007 | Hansford et al. |
| 2010/0178547 | A1 | 7/2010 | Li |
| 2011/0273132 | A1 | 11/2011 | Khaitan et al. |
| 2012/0169286 | A1 | 7/2012 | Navid |
| 2012/0301763 | A1 | 11/2012 | Tonomura et al. |
| 2013/0043826 | A1* | 2/2013 | Workman ........... H01M 10/613 320/101 |
| 2013/0183562 | A1 | 7/2013 | Workman et al. |

(Continued)

FOREIGN PATENT DOCUMENTS

| CN | 206180022 | 5/2017 |
|---|---|---|
| EP | 3264491 A1 | 1/2018 |

(Continued)

OTHER PUBLICATIONS

Search Report and Written Opinion for PCT/US2019/046687 (dated Oct. 28, 2019).
Machine translation of CN206180022.

*Primary Examiner* — Mandeep S Buttar

(57) ABSTRACT

A power storage and generation system is modular, portable, stackable, electrically connectable, interchangeable, and customizable with respect to interconnections among one another. The electrical connections are arranged in such a manner that they are not exposed to the user when in use, thus preventing accidental short circuits or electrical shocks. The power storage and generation systems can be used together or separately to provide both D/C power then converts to A/C power supply for electrical equipment at remote locations. Different configurations allow for the adaptation of the system to different voltage and amperage requirements for various applications.

14 Claims, 38 Drawing Sheets

(56) References Cited

U.S. PATENT DOCUMENTS

2014/0111121 A1    4/2014   Wu
2014/0357094 A1   12/2014   Kim
2018/0006470 A1    1/2018   Stacey et al.

FOREIGN PATENT DOCUMENTS

WO          2017074026 A1   12/2014
WO   WO-2018002156 A1 *   1/2018  ............ H02J 7/0045

* cited by examiner

SECTION A—A

SECTION A—A

SECTION B-B

SECTION B-B

SECTION C-C

SECTION D-D

SECTION D-D

MODULAR BATTERY POWER STORAGE AND GENERATION SYSTEM

CROSS-REFERENCE TO RELATED APPLICATIONS

This application claims the benefit of U.S. Provisional Patent Application No. 62/656,384, entitled "Modular Battery Power Storage and Generation Systems," filed on Apr. 12, 2018. Such application is incorporated herein by reference in its entirety.

BACKGROUND OF THE INVENTION

The present invention relates to energy storage systems, and more particularly to a modular rechargeable battery power system.

Conventional lead acid battery or rechargeable battery packs for providing power to electric vehicles, electrical devices, and accessories have many limitations. First, the lead acid solutions that are currently being used for most utility electric vehicles are very inefficient in term of space and weight. Lead acid batteries require many times more raw material than lithium-ion to achieve the same energy storage, making a much larger negative impact on the environment and are highly hazardous to human health. On the other hand, lithium iron phosphate batteries offer significant advantages, including improved discharge and charge efficiency, longer life span, and the ability to deep cycle while maintaining performance.

When high capacity and voltage is required, the conventional lead acid battery or rechargeable battery packs are made up from multiple cells or batteries connected to one another by cable and clamp connectors partially exposed, which may present shock and/or short circuit hazards. Also, the size and weight of the batteries will greatly increase making it very difficult and inconvenient for the user to install, maintain, and transport. Furthermore, most of the batteries are for single-purpose usage. In most cases, this is D/C to D/C application only, which limits the use of the battery for other applications that require A/C power. In order to provide A/C power to electrical equipment at remote locations without access to the power grid or in the event of natural disasters or extreme weather emergencies such as hurricanes, earthquakes, fires, ice storms, or other conditions leading to power outage, fuel generators are most commonly used during these events. These types of generators require frequent maintenance and are costly to maintain. Additionally, fuel generators are very loud, require toxic fuels, and are environmentally hazardous.

To become energy independent and off the grid, there is a desire and need to provide an improved power storage and generation system that is a more reliable power source wherever electricity is needed; a power storage and generation system that is modular and thus allows quick and easy connection and disconnection from its base charging station, transport, and reconnect to a portable charger inverter to directly power electronic equipment or recharge batteries for other consumer electronics; a power storage and generation system able to charge and recharge using a wall outlet (grid), solar power or other power sources; and a power storage and generation system that is modular, portable, stackable, electrically connectable, interchangeable, and expandable to provide the desired power voltage and capacity for various applications. Further, a system that does not provide exposed electrical connections is desired and needed to maintain safety for the system's users.

It is apparent that a need exists for an improved power storage and generation system that overcomes the disadvantages of the prior art. The present invention is directed toward providing such system and method that its predecessors do not provide.

BRIEF SUMMARY OF THE INVENTION

The present invention provides solutions to these problems by providing a power storage and generation system that is modular, portable, stackable, electrically connectable, interchangeable, and customizable with respect to interconnections among one another. The electrical connections are arranged in such a manner that they are not exposed to the user when in use, thus preventing accidental short circuits or electrical shocks. In certain embodiments, the power storage and generation systems can be used together or separately to provide both D/C power for utility electric vehicles (UEVs) such as a battery-powered scooter, bike, and golf cart, and most portable electronics, then converts to A/C power supply for electrical equipment at remote locations without access to the power grid or in the event of natural disasters or extreme weather emergencies such as hurricanes, earthquakes, fires, ice storms, and other causes of power outages.

In certain embodiments, the stackable, interchangeable, and modular nature of the invention provides features of allowing the power storage system to easily disconnect from UEVs to reconnect to a base charger and charge the battery system with the capability to add-on additional battery systems to maximize or increase the capacity of the system for other applications. The power storage and generation systems can be charged and recharged by a regular wall outlet, solar, or other renewable power sources. The power storage and generation systems are able to connect to one or more adjacent power systems' top and bottom caps from above or below, respectively, with associated electrical connectors connecting the internal circuitry to transfer current from one system to another system to provide the desired power voltage and capacity for various applications. The systems' endcaps and connectors permit it to be installed in any orientation, such that the systems may be used standing upright, lying sideways at ninety degrees, or any other increments, and the components will still reliably connect. The endcaps are designed to inherently shield the electrical connections from inadvertent contact. Also, the special connectors feature allows the systems to easily be disconnected, transported to where power is needed, and then reconnected. The power storage and generation system is capable of providing either D/C or A/C power and it can be customizable and expandable to provide the desired power voltage and capacity for various applications. The power storage and generation system may in certain embodiments include voltage or power status indicators, a convenient on/off switch, and remotely access and control to power on/off in order to minimize unintentional drain on the systems.

In certain embodiments, a number of additional features may be included. The battery bottom and bottom covers with an associated electrical connector construction may be identical with other battery, charger, inverter, or power systems. The battery module can be stacked below or on top of the power systems' associated electrical connector. The first battery module may be parallel connected to independently charge and discharge the second or other battery modules. The systems top and bottom covers design and construction may allow the battery to work independently, replacing the need to increase or decrease the energy capacity without interruption or discontinuing the modular power storage and generation system while in operation. The battery modules may include fire extinguisher modules that automatically act to prevent an overheating condition within the battery from causing a fire.

DETAILED DESCRIPTION OF THE PREFERRED EMBODIMENT(S)

Figure 1A:
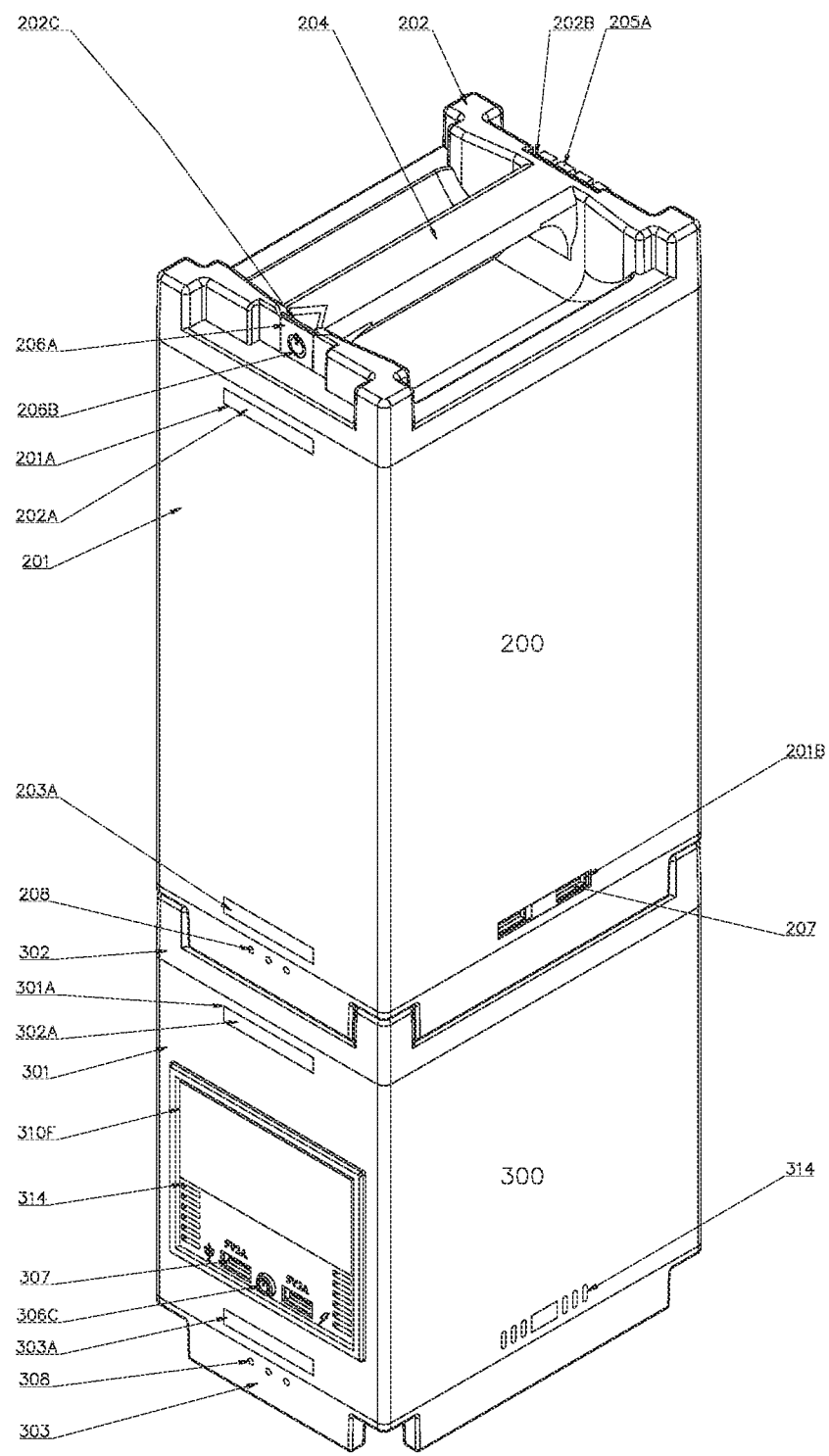
FIG. 1A is a top-down perspective view of a power storage and generation system according to an embodiment of the invention.
Figure 1B:
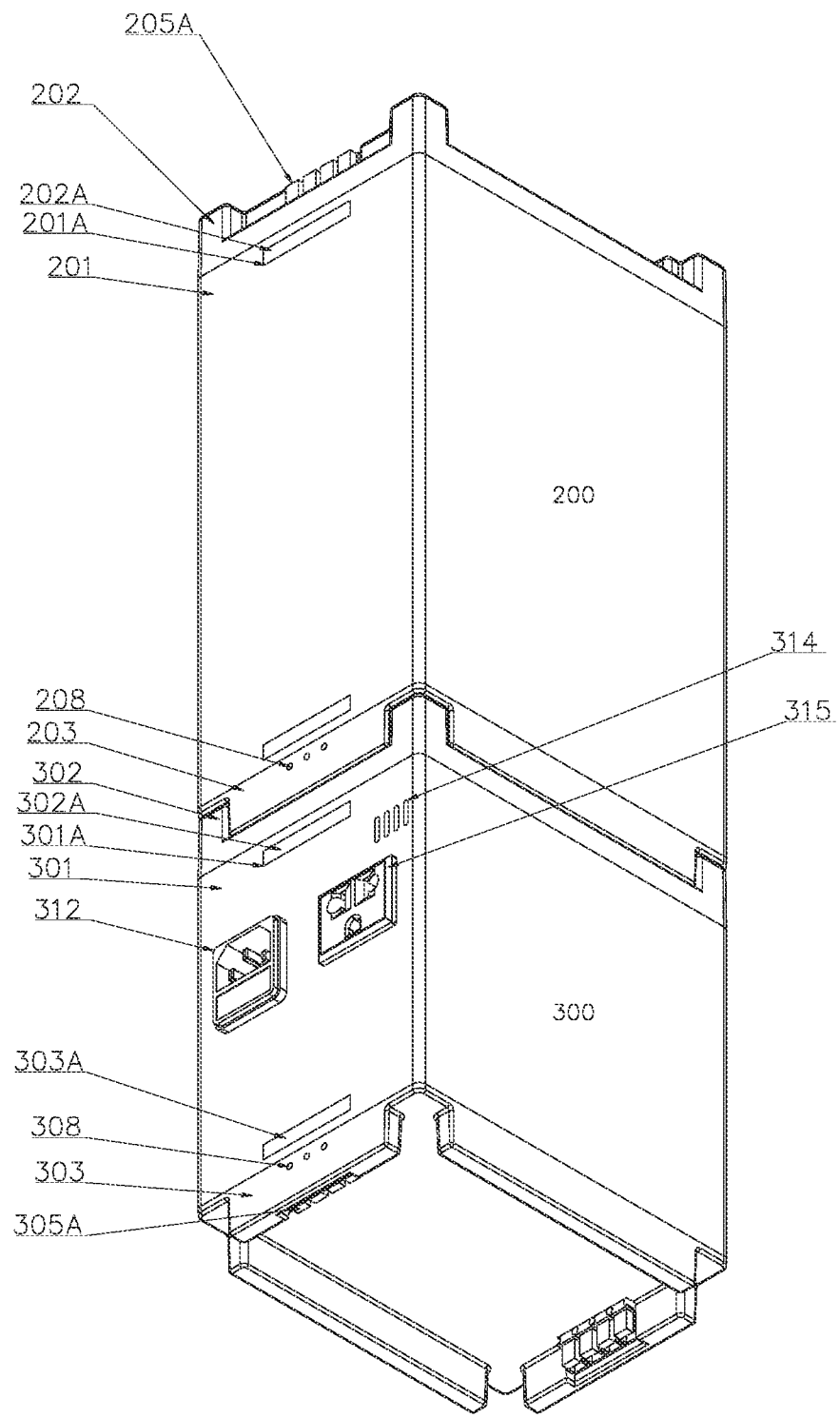
FIG. 1B is a bottom-up view of a power storage and generation system according to an embodiment of the invention.
Figure 1C:
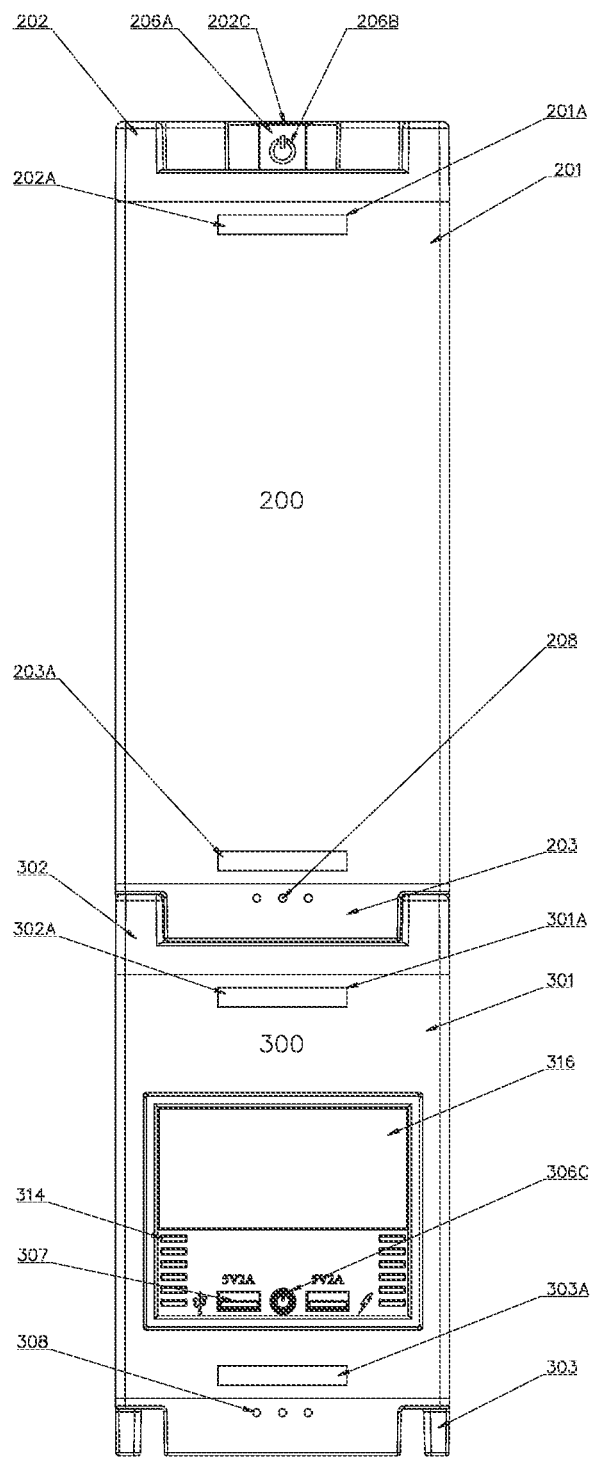
FIG. 1C is a front elevational view of a power storage and generation system according to an embodiment of the invention.
Figure 1D:
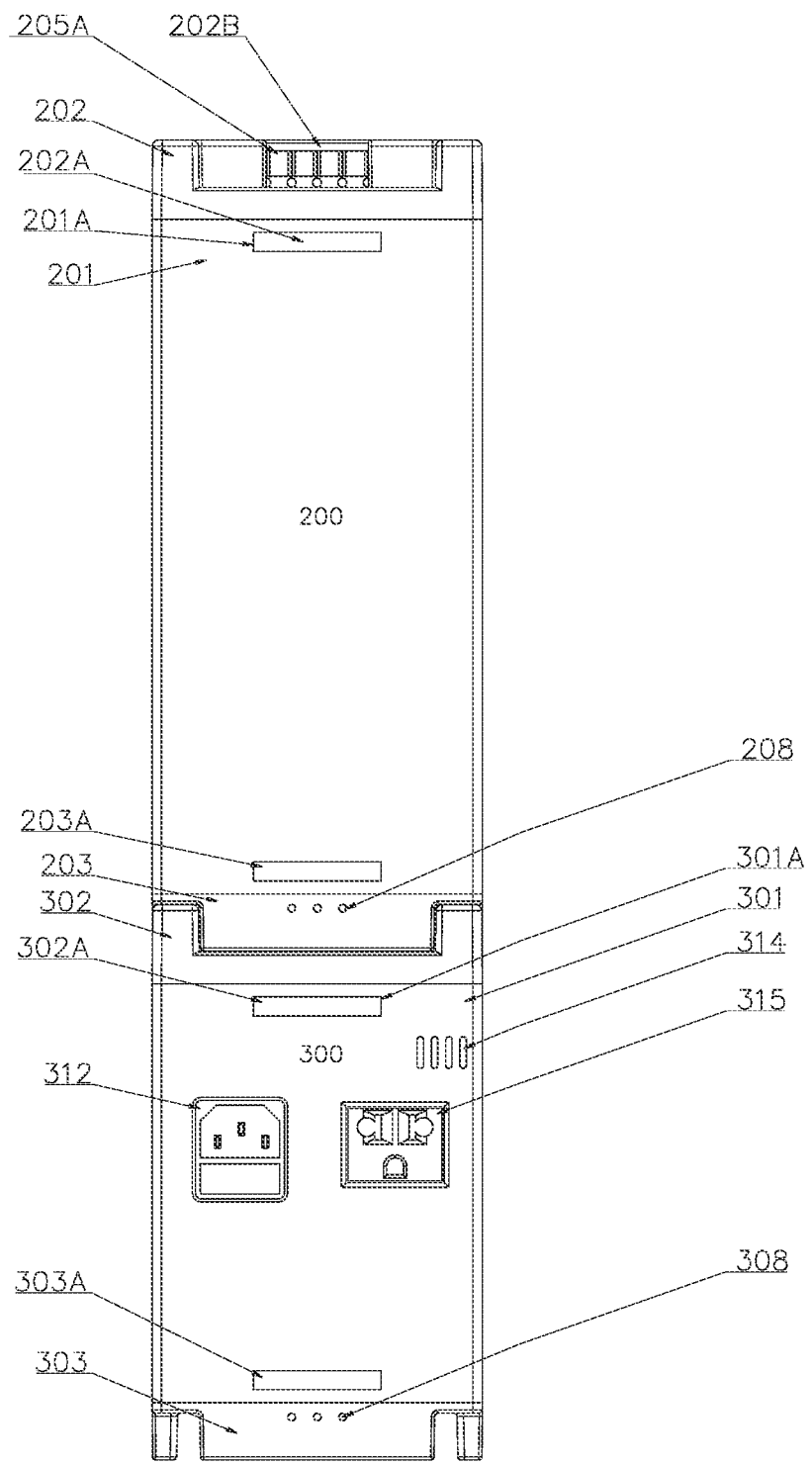
FIG. 1D is a rear elevational view of a power storage and generation system according to an embodiment of the invention.
Figure 1E:
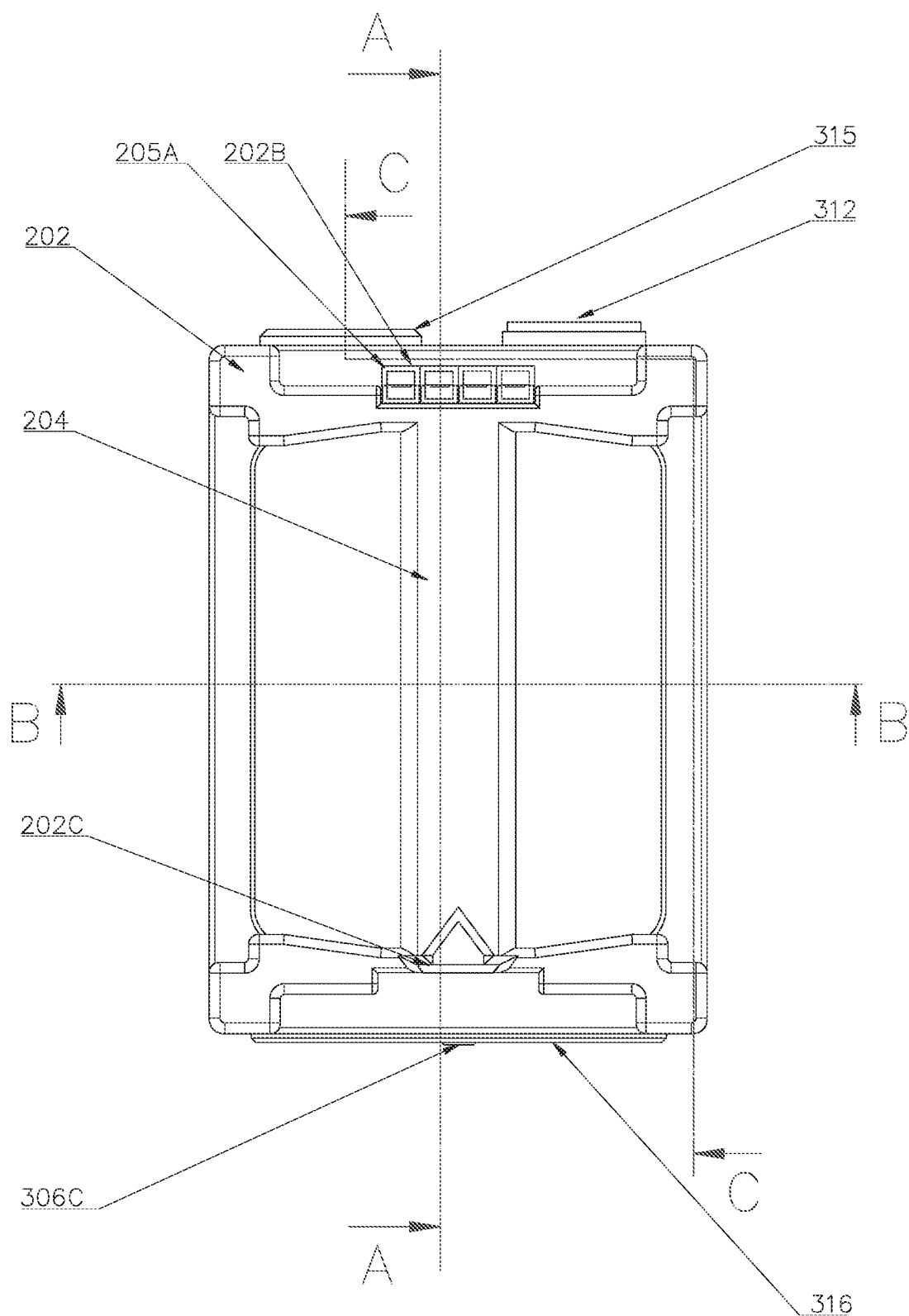
FIG. 1E is a top plan view of a power storage and generation system according to an embodiment of the invention.
Figure 1F:
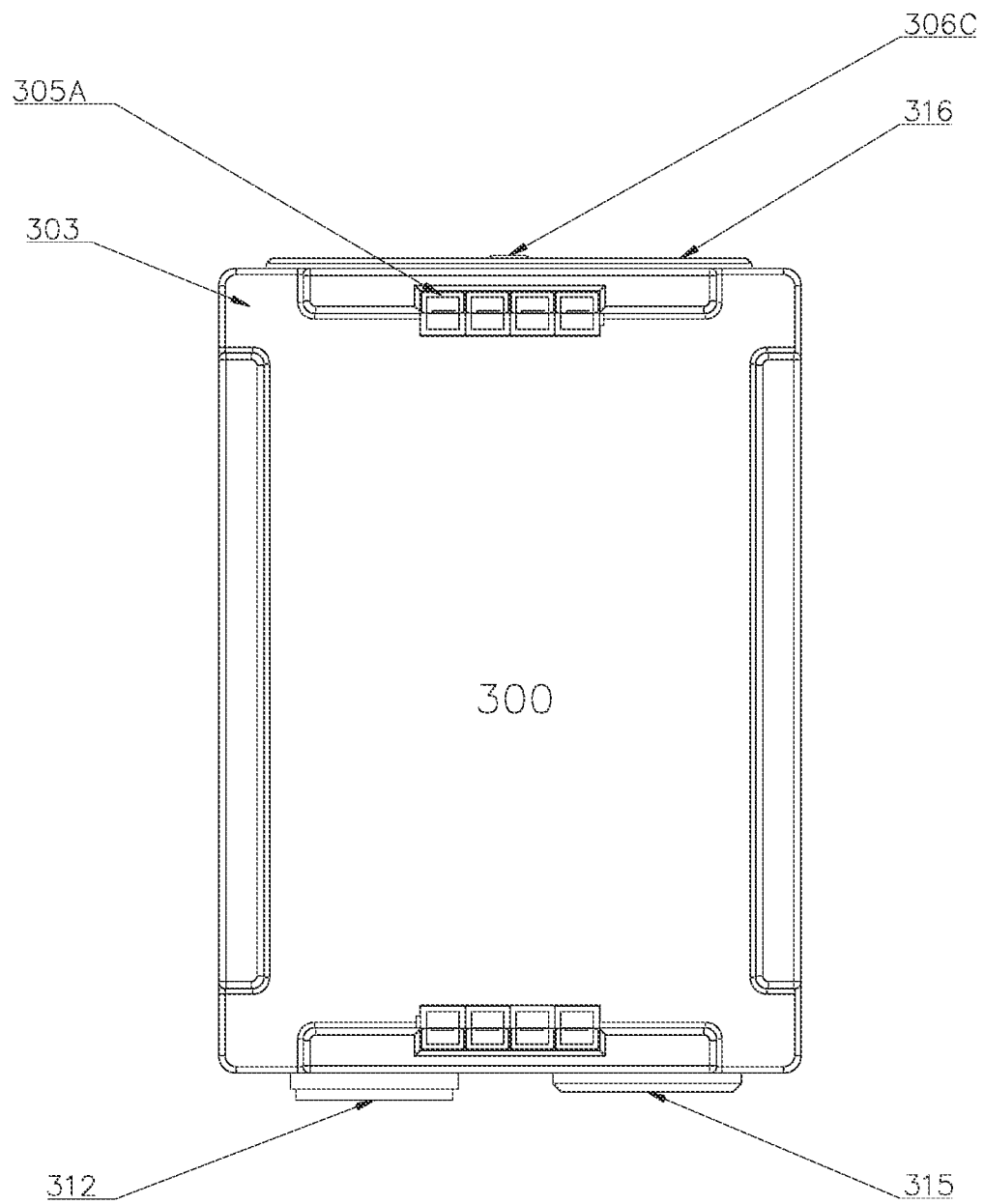
FIG. 1F is a bottom plan view of a power storage and generation system according to an embodiment of the invention.

All numbers used in the specification and claims are to be understood as being or may be modified, unless otherwise indicated. Accordingly, the numerical parameters set forth in the following specification and attached claims are approximations that may vary depending at least upon the specific analytical technique, the applicable embodiment, or other variations according to the particular configuration of the systems. The order or sequence of any process or method steps may be varied or re-sequenced according to alternative embodiments. Other substitutions, modifications, details, changes and omissions may be made in the design, operating configuration and arrangement of the present, preferred and other exemplary embodiments may be made without departing from what is covered in the appended claims.

In general, the modular power storage and generation system 100 comprises a power storage system 200, which is an energy storage or battery module with internal components and electrical circuitry that are able to store electrical energy; power generation system 300, which is a power control module with internal circuitry, including A/C and D/C input and output connectors supplying both an A/C and D/C electrical power supply; and system docking station 400, which is a base that is electrically connected to charge and discharge multiple power storage systems 200 in place of power generation system 300.

With reference to FIGS. 1-3D, a first embodiment of the present invention may be described. The overall power storage and generation system 100 consists of one or more power storage modules 200 and power generation modules 300. The modular nature of the system allows for various custom configurations to be created in order to power a desired load, and then readily disconnected and then reconnected in a different configuration to power another load application. The modular nature of the individual power storage systems 200 permit the power generation system 300 to be disconnected from power storage systems 200 into individual modules that are each more readily transported to a desired location and conveniently reconnected as desired. The power storage system 200 features multiple D/C input and output terminals 205A that recess so the power storage system 200 can easily connect or dock to a power generation system 300 or docking station 400. Connectors 305A on power generation system 300 provide for the D/C interconnection between a power storage system 200 and a power generation system 300, such that D/C current passes between connectors 205A and 305A. In the case where two power storage systems 200 are stacked vertically, D/C power may be transferred between connectors 205A on the top side of a power storage system 200 and connectors 203A on the bottom side of a power storage system 200. Because of the design and arrangement of connectors 205A and 305A, it may be seen that when a power storage system 200 and power generation system 300 are connected, the connection is not exposed such that there is no risk of an inadvertent short circuit by contact with a conductor in the area or shock due to a person touching the system when in use. Likewise, when two power storage systems 200 are connected, the interconnection between corresponding connectors 205A at the top of one power storage system 200 and connectors 203A at the bottom of the next power storage system 200 provides a shielded connection preventing inadvertent short circuit or shock.

The power generation system 300 may have inlet sockets 312 and outlet sockets 315 or other connector terminals that can be charge from the wall outlet or other renewable energy sources such as solar, wind, or any other source. The power storage system 200 as shown in FIGS. 1-2C includes an outer casing 201 uniquely designed with top and bottom caps 202 and 203, respectively, with associated connectors as described above that make it easier to transport, assemble and disassemble, electrically connecting to one another. Various embodiments of the invention will be described in detail with reference to the accompanying drawings.

The power storage system 200 comprises an outer casing 201 with a latch slot 201A and USB slot 201B to lock the top and bottom caps into place; a top cap 202 with associated carrying handle 204, top cap slot 202A, terminal slot 202B, and power button slot 202C; a bottom cap 203 having bottom cap latches 203A and terminal slot 203B; terminals 205 including terminal housing 205A and power contact 205B that may fastened in place with retainer pins 208; ON/OFF power switch or button 206A, which may have a LED indicator 206B indicating the power or operating status; the battery cells 209D held together with cell holders 209C and connector tubes 209B; electrically connecting to alloy plate 209E, alloy or copper bar 211B, and alloy cable wire 211A; battery management system (BMS) 210B; USB ports 207; and PCB module 210A, which are separated and secured in place by fastener 209A, insulator plate 209F and cover 209G.

The power generation system 300 comprises an outer casing 301 having latch slot 301A and vent slot 314 to lock the top and bottom caps into place; top cap 302 with associated carrying handle 304, top cap latch 302A, terminal slot 302B, and power button slot 302C; bottom cap 303 having bottom cap latches 303A and terminal slot 303B; terminals 305 including terminal housing 305A and power contact 305B that may fastened in place with retainer pins 308; ON/OFF power switch or button 306A, which may have a LED indicator 306B indicating the power or operating status; secondary power switch or bottom 306C; PCB module 310A; power board 310D; control board 310E; LCD board 310F; UBS ports 307; mounting panel 316 with USB slot 316A and power button slot 316B; cooling fan 313; wiring 311A; screw 309A; and inlet 312 and outlet sockets 315.

Figure 5:
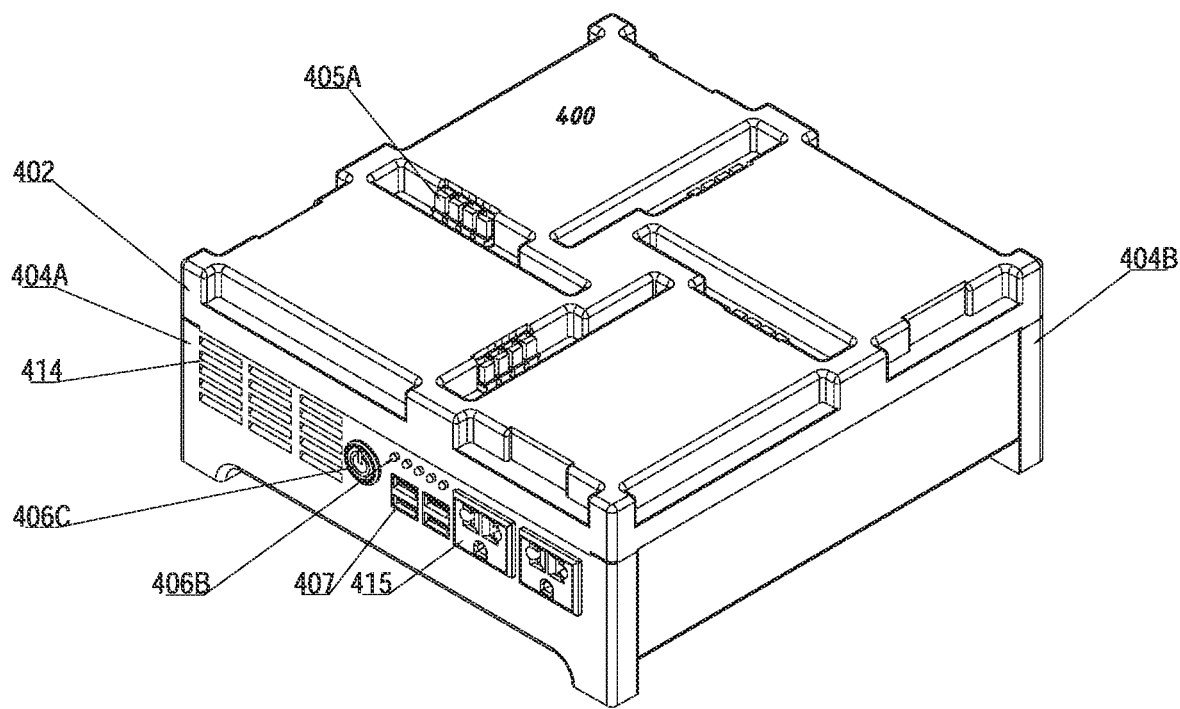
FIG. 5 is a top-down perspective view of a power generation system according to an embodiment of the invention.
Figure 5A:
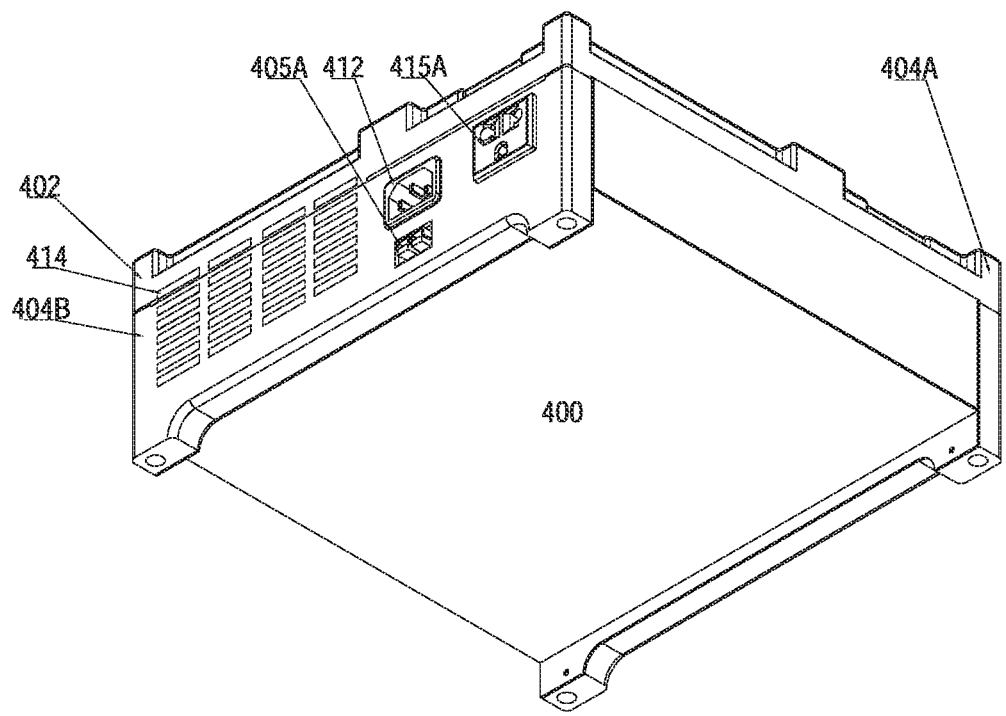
FIG. 5A is a bottom-up perspective view of the power generation system shown in FIG. 5.
Figure 5B:
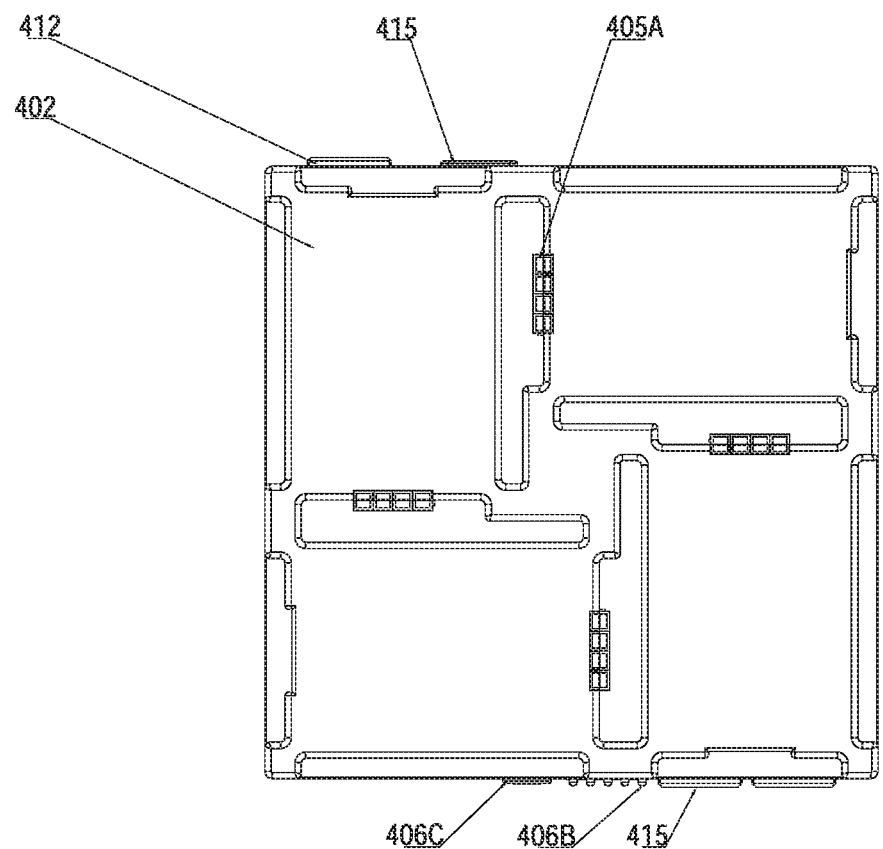
FIG. 5B is a top plan view of the power generation system shown in FIG. 5.
Figure 5C:
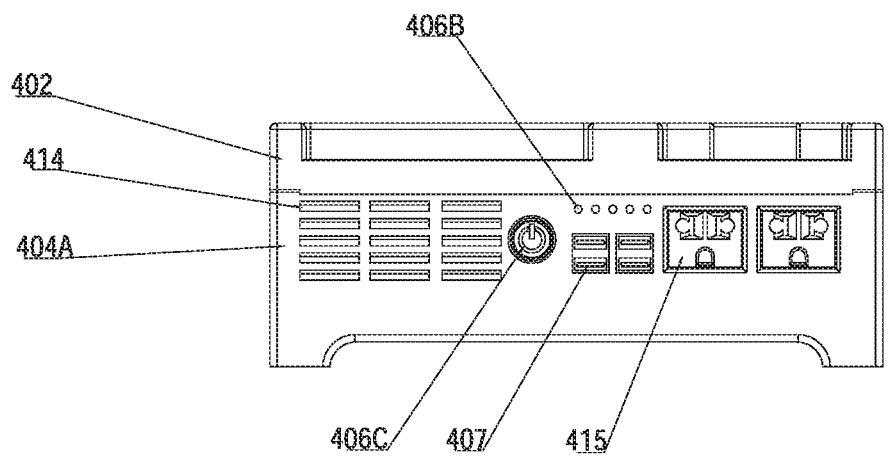
FIG. 5C is a front elevational view of the power generation system shown in FIG. 5.
Figure 5D:
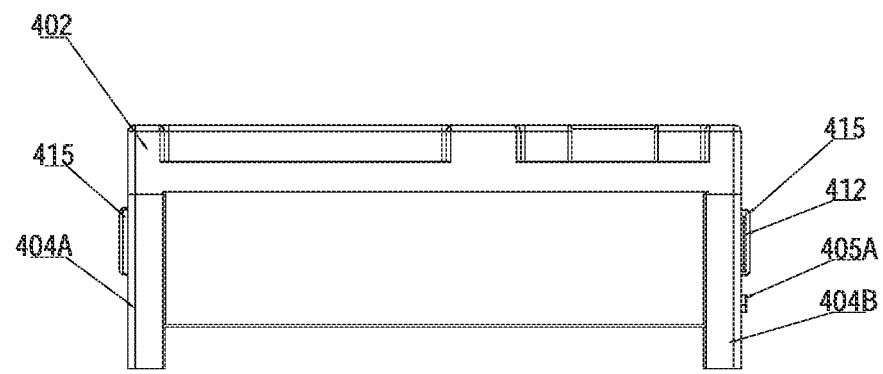
FIG. 5D is a side elevational view of the power generation system shown in FIG. 5.
Figure 5E:
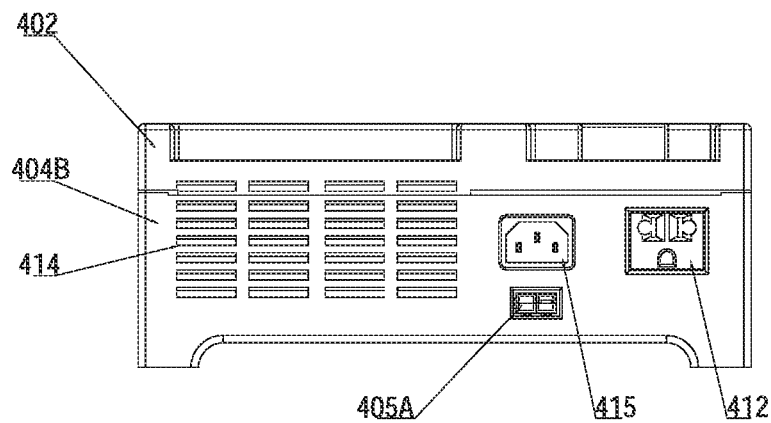
FIG. 5E is a rear elevational view of the power generation system shown in FIG. 5.

The docking station 400, as shown in FIGS. 5-5E, comprises a base with one or more receptor terminals 405A including terminal housing 404A and power contact 405B with a similar design construction as the systems so the docking station and power storage system may easily disconnect or connect as shown in FIG. 6-8C. The docking station 400 can charge or discharge the power storage system 200 when connected. The system may discharge power from the power storage system 200 by transferring power from the power storage system 200 by either providing D/C power for utility electric vehicles (UEVs) such as a battery-powered scooter, bike, golf cart, or the like, or most portable electronics with terminals 204 directly or terminals connecting to the docking station 400.

The power generation system 300 or docking station 400 may discharge the power from the power storage system 200 by transferring power from the power storage system 200 to power generation system 300 providing both 5 VDC USB ports 307 and 100-220 AC 315 outlet socket or output terminals to supply power for most electrical equipment. Stacking multiple power storage systems 200 provides an expandable and flexible source of power supply and power storage for utility electric vehicles as desired. If the user requires additional power, he or she may choose to add one or more power storage systems 200, while a user whose power needs are relatively lower may choose to reduce the number of power storage systems 200 in the overall system.

Figure 3A:
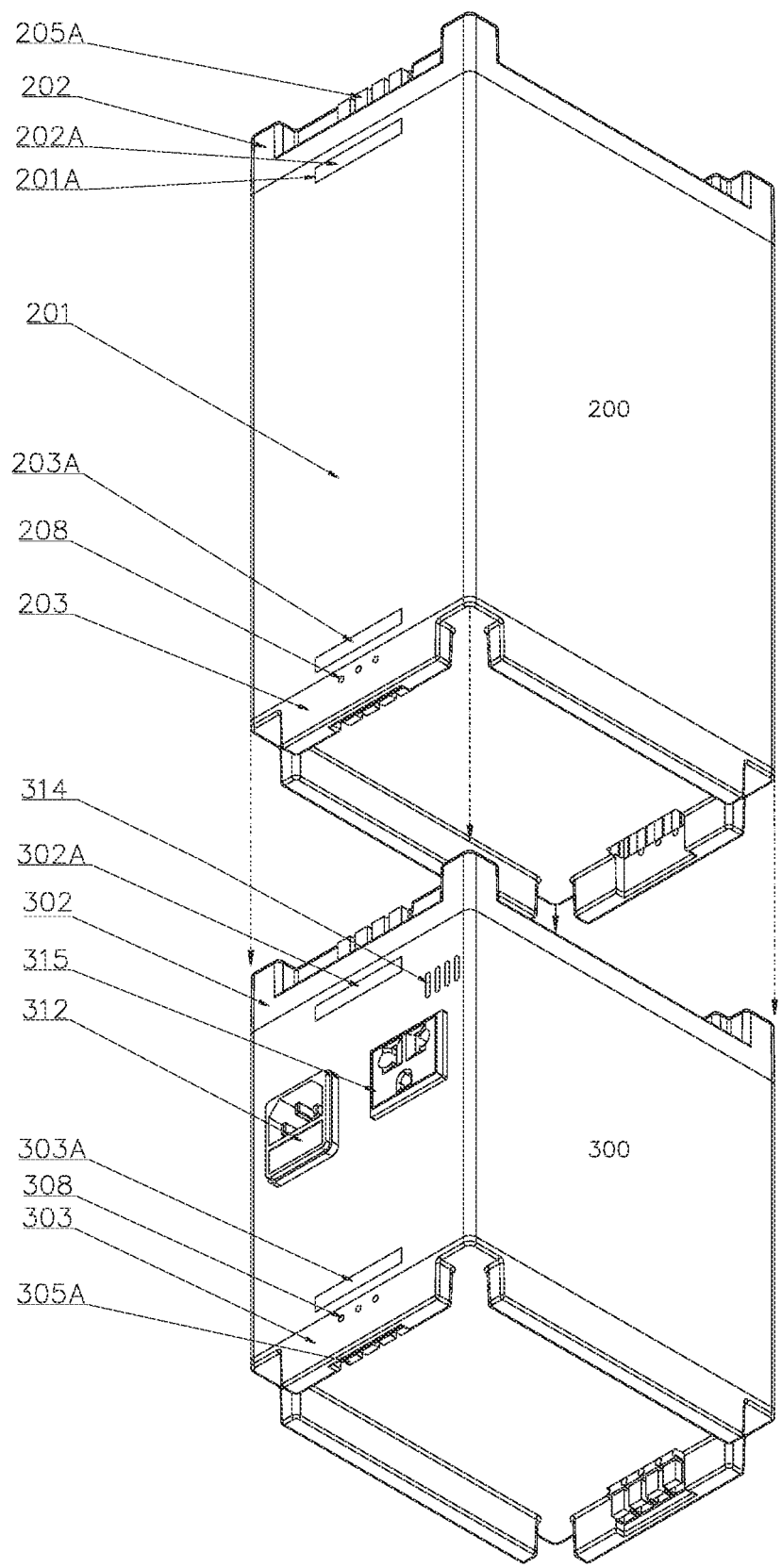
FIG. 3A is an exploded bottom-up perspective view of a power storage system
  connecting to a bottom power generation system according to an embodiment of the invention.
Figure 3B:
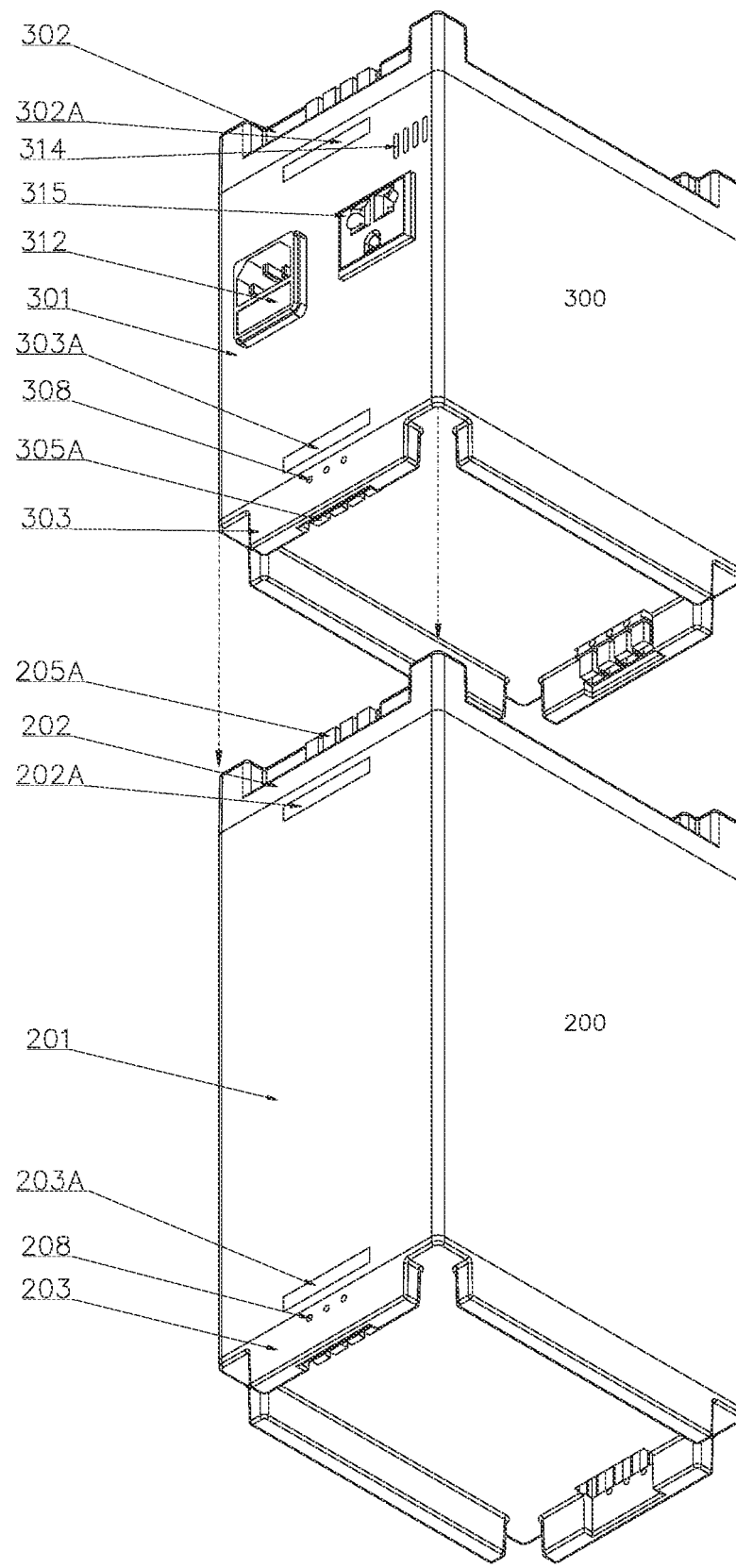
FIG. 3B is an exploded bottom-up perspective view of a power storage system
  connecting to a top power generation system according to an embodiment of the invention.
Figure 3C:
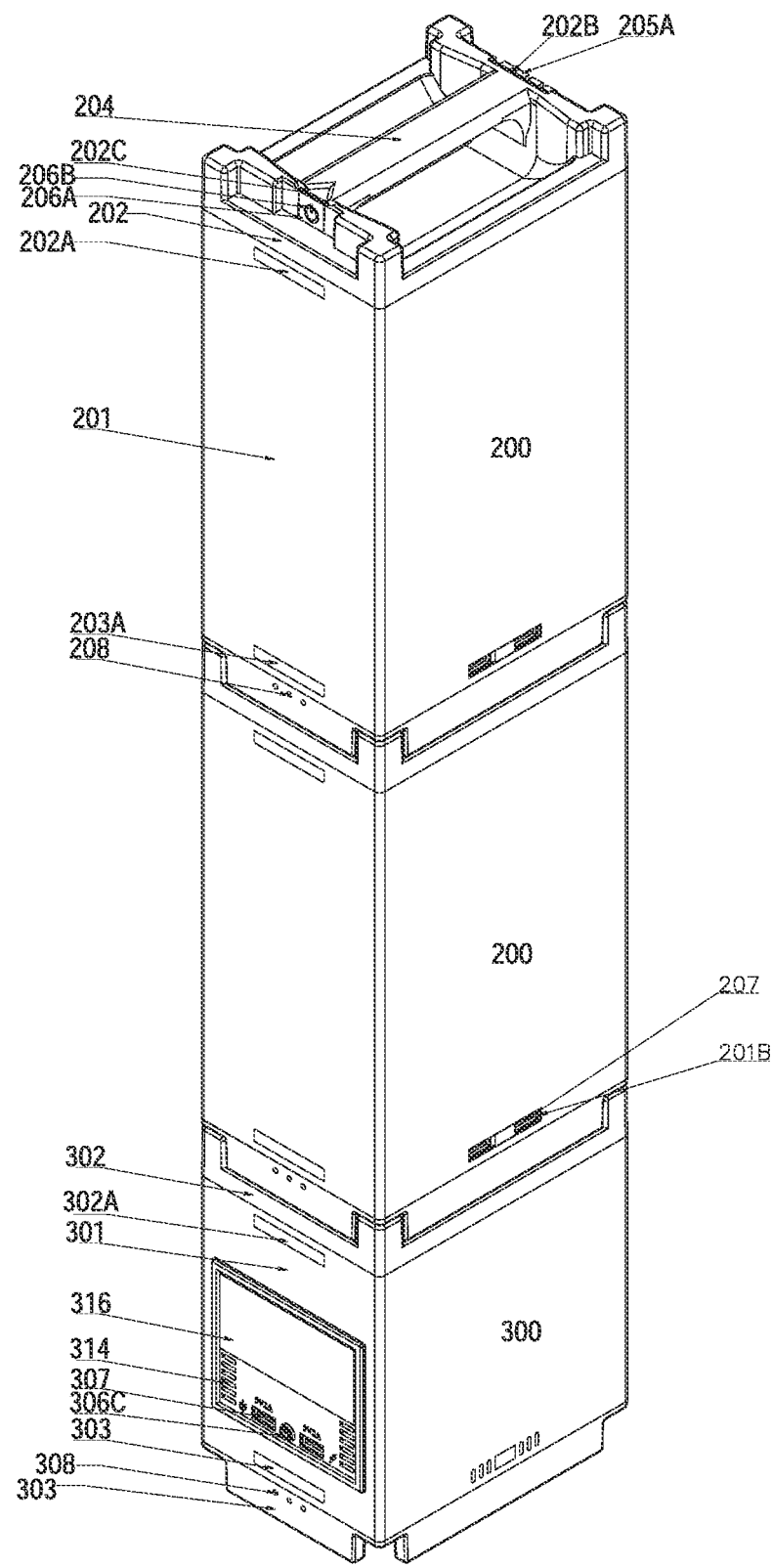
FIG. 3C is a top-down perspective view of two power storage systems connected to a bottom power generation system according to an embodiment of the invention.
Figure 3D:
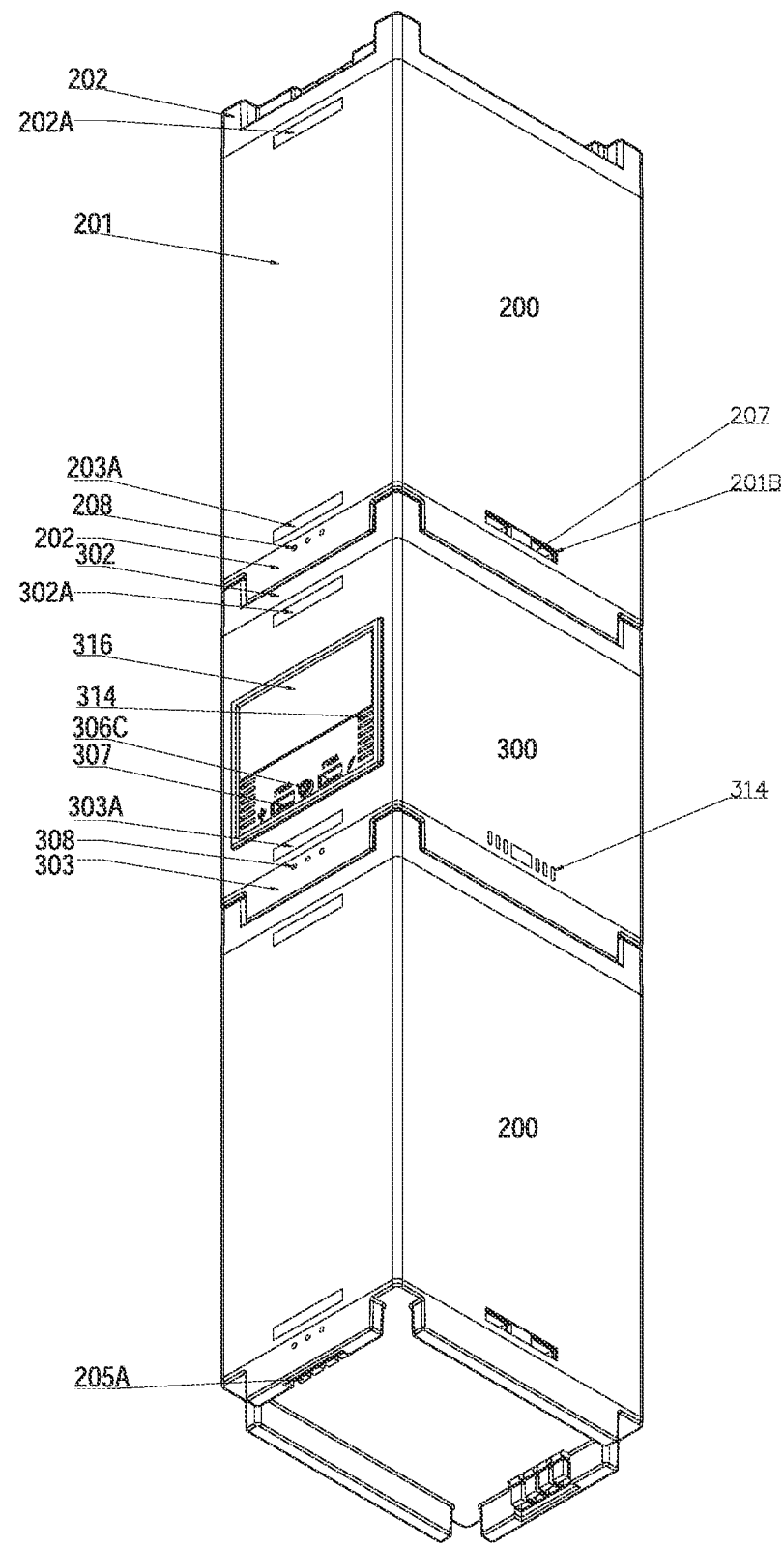
FIG. 3D is a bottom-up perspective view of two power storage systems connected to the top and bottom, respectively, of a power generation system according to an embodiment of the invention.

The power storage and generation system 100 include top cap ends 202 and 302, which are male receptacles; and bottom cap ends 203 and 303, which are female receptacles. The outer casings feature identical top and bottom caps of the power storage system 200 and power generation system 300 that form male and female receptacles. The system endcaps and connectors permit the power storage system 100 to be connected in either direction. The systems may either be used standing upright, at 180 degrees, or lying side way 90 degrees, or other increments, and the systems will still connect; the unique connectors feature allows the power generation system 200 to easily connect and disconnect to one or more power storage systems 200, such as shown in FIG. 3A-D. The power storage system 200 may either connect to the top or bottom of the power generation system 300 by the top and/or bottom caps that house the terminals 205 and 305 with associated electrical connectors connects to the internal electrical components to permit the power generation system 300 to charge the power storage system 200 from an A/C wall power outlet, solar, or other power sources. The identical top and bottom caps with connectors allowing the power storage and generation systems 100 able to connect to one or more adjacent systems from above or below, as shown in FIGS. 3C and 3D. The terminals 205 and 305 with associated electrical connectors connecting the internal circuitry to transfer current from one system to another system to provide the desired power voltage and capacity for various applications. The complementary nature of the connections for power storage system 200 and power generation system 300 allow any configuration of multiples of these components, as desired by the user. For example, FIG. 3A illustrates a power storage system 200 connected on top of a power generation system 300; FIG. 3B illustrates a power generation system 300 connected on top of a power storage system 200; FIG. 3C illustrates an arrangement similar to FIG. 3A but with an additional power storage system 200' installed on top of the first power storage system 200; and FIG. 3D illustrates an arrangement similar to FIG. 3B but with an additional power storage system 200' installed on top of power generation system 300.

Figure 2A:
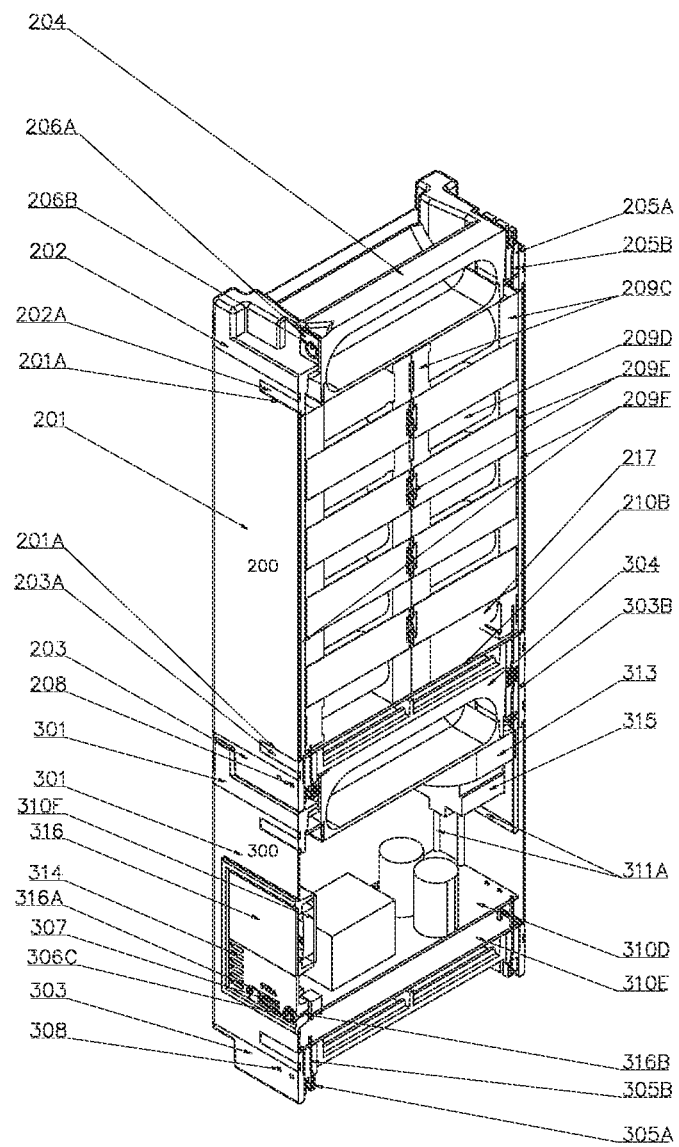
FIG. 2A is a top-down perspective internal view taken along the [A-A] section line of FIG. 1E.
Figure 2B:
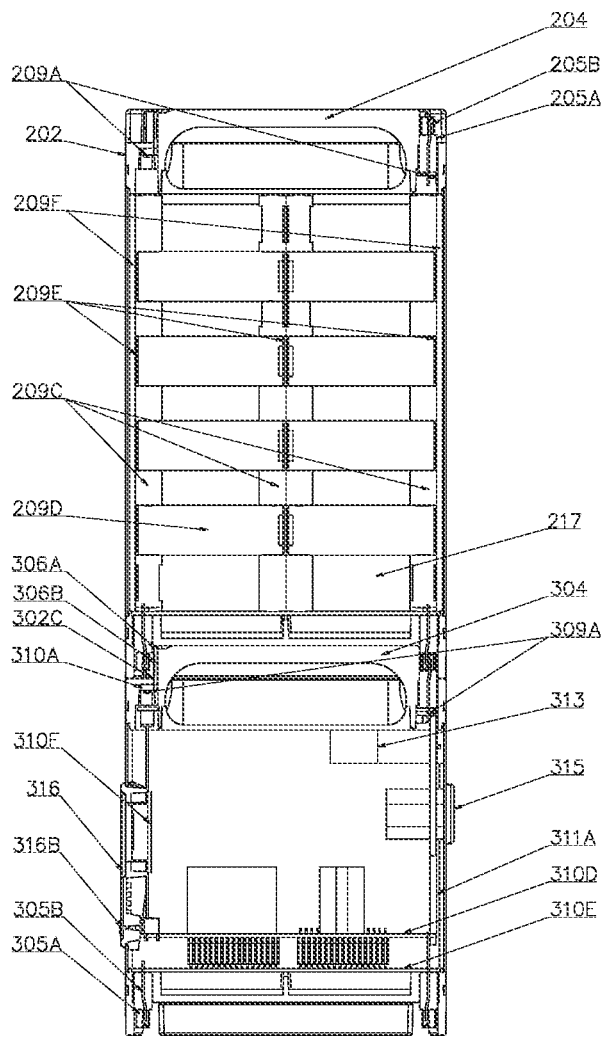
FIG. 2B is a side elevational internal view taken along the [A-A] section line of FIG. 1E.
Figure 2C:
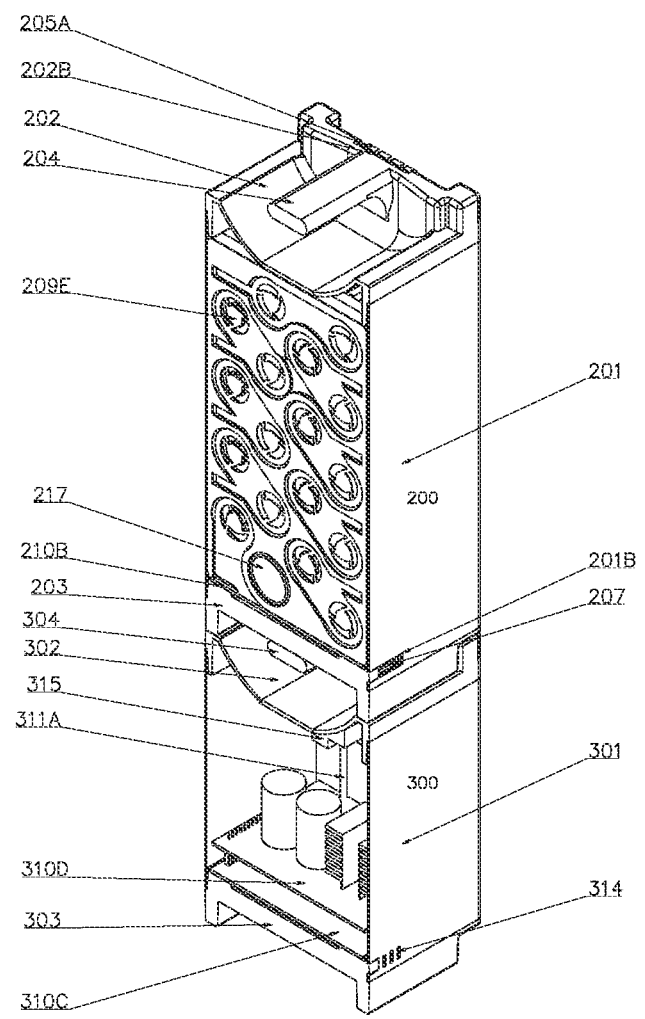
FIG. 2C is a top-down perspective internal view taken along the [B-B] section line of FIG. 1E.
Figure 2D:
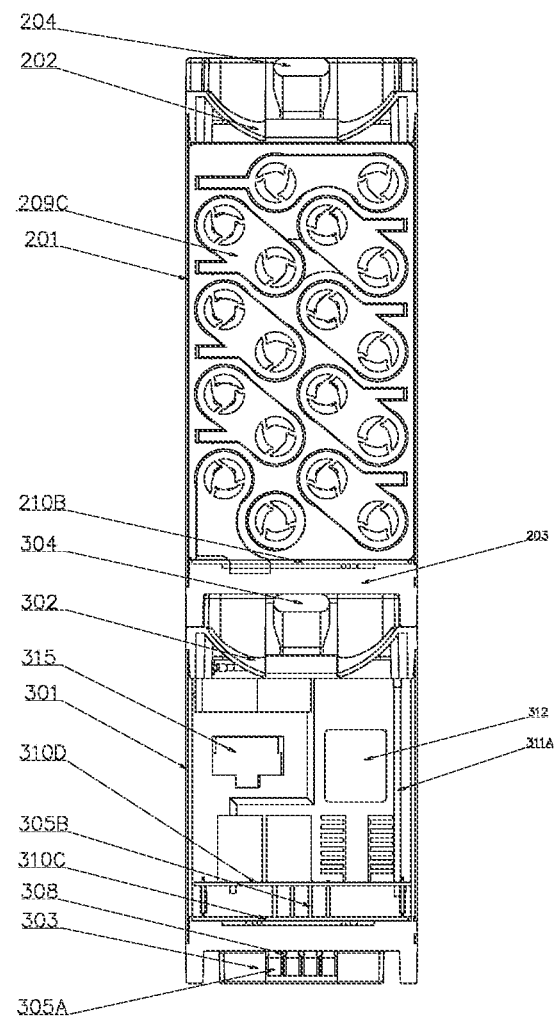
FIG. 2D is a side elevational internal view taken along the [B-B] section line of FIG. 1E.
Figure 2E:
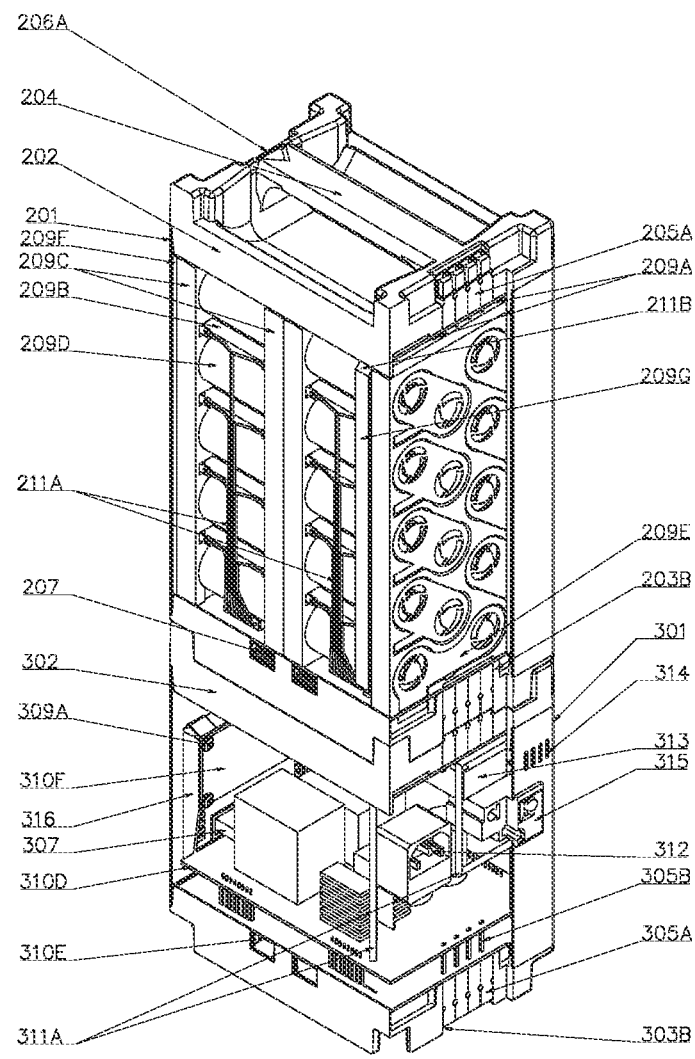
FIG. 2E is a top-down perspective internal view taken along the [C-C] section line of FIG. 1E.

As shown, for example, in FIG. 2A, the power storage system 200 and power generation system 300 terminals use an associated electrical connector power contact 205B and 305B that interlock in place when connected to one or more adjacent systems. The power storage and generation systems 100 are capable of operating at either D/C or A/C voltage. PCB boards 310A include an inverter with the internal charge-and-discharge electrical components. The power generation system 300 further includes a heat sink connected to the inverter on the power board 310D. The power storage and generation system 100 may include a voltage or power status indicator 306, and convenient on/off switch 306A, with remotely access and control to power on/off to minimize unintentional drain on the systems. The system may also include an internal battery management system (BMS) 210B and electrical circuit board that enable the system to be connected via Bluetooth or Wi-Fi access to monitor the status of the battery module. The BMS may have either Bluetooth or/and Wi-Fi capabilities.

The power storage system 200 comprises multiple lithium ion phosphate battery cells 109D that are connected either in series, parallel, or a combination of both. However, according to other alternative embodiments, other battery materials and sizes may be used. A wide variety of capacities and voltages may be configured depending on the desired application. Battery cell holders 109C may be used, which can easily access and/or replace a damaged individual battery cell 109D without disassembly of the entire battery pack. The user may simply disconnect the appropriate cable, wiring, and welder joints to remove or replace the damaged cell. Connection between battery cells to/from the electrical circuitry may be different depending on the battery size and voltage configurations (series, parallel, or combination of both). Depending on the different configurations, some cells 109D may be grouped in a series connection, and others in parallel. A system 200 may produce 12V, 24 V, 36V, 48V, 60V, 72V and 5, 10, 15, 20 Ah, respectively, when hours fully charged, although other voltage, capacity, settings and configurations may be used. The system 200 may have a capacity of 480 watt-hours (48V 10 Ah), and other embodiments of the system, for example, may have a capacity of 960 watt-hours (48V 20 Ah), and each system comprises a lithium ion phosphate battery cell material. However, according to alternative embodiments, other battery materials and chemistries may be used, and a wide variety of capacities and voltages may be provided depending on the configuration for variety of applications.

The power generation and storage system 100 in may independently charge from each storage system 200. The systems may be electrically connected to the storage system through a terminal with associated power connectors and contacts. In other cases the module 300 of one storage system 200 may be electrically connected to module 300 and the battery 200 of another storage system 200'. The power module 300 may be connected to independently charge and discharge to both storage system 200 and 200' simultaneously.

The power storage and generation systems 100 may include electronic components including an input protection circuit, an output protection circuit, a charge controller, a display controller and a temperature controller, which may be configured on power controller circuit board 310E. The input protection circuit may include an input port that will shut down when the temperature exceeds a predetermined level to protect the battery from being overcharged, overheated or otherwise damaged. The output protection circuit may include output connection ports and other suitable electronic components for delivering appropriate electrical power from the battery to the outlet ports. The input and output ports are protected by a readily accessible fuse having a suitable rating. The power controller circuit board 310E regulates the charge and discharge to the power storage system 200. The LCD display 310F circuit detects the voltage of the battery and controls the LCD display that indicates the real-time charge of the battery module. The temperature controller includes a temperature detector that monitors D/C and A/C inputs and outputs, such that when the temperature sensed by the detector exceeds a predetermined set point, it will automatically cut power off. Casing 301 may be made of a heat conductive metal, thus allowing heat transfer between the internal part and the external part to facilitate operation at the most desirable temperature and conditions.

The system may use pins 308 to secure components in place. These may be manually inserted and removed in order to reconfigure the system. The top and bottom cap ends are made from a resilient, tacky, or other non-slip material whose properties or characteristics to help minimize relative movement of components when connected together as an assembly.

In certain embodiments a fire retardant/extinguisher capsule 217, as shown for example in FIG. 2C, is employed to protect the battery from fire in the case of an overheat condition. In normal use, a lithium ion battery remains at a temperature of below 40° C. Overheating can result from various causes, such as damage to the battery, a short circuit, overcharging, application of reverse polarity, or exposure to a high ambient temperature. The circuitry in power storage system 200 will, in certain embodiments, turn off power storage system 200 when the temperature reaches an unsafe level, such as 55° C. in one example.

If the circuitry fails to turn off power storage system 200 and temperature continues to increase, then capsule 217 may be activated in one of two ways. First, there are positive and negative leads into capsule 217, which are separated by a polymer fiber material (polymorph). Polymorph is a nontoxic, biodegradable polyester with a low melting temperature of about 60° C. Other materials may be used, with melting temperatures between 55° C. and 65° C. When the polymorph separating the leads melts due to a signal being sent across the leads, then electrical contact is made between them. This contact ignites an explosive material within capsule 217. The explosion that results sends flame retardant material through the interior of power storage system 200 to extinguish the fire. The flame-retardant materials used in capsule 217 may include phosphorous, carbon dioxide, powdered graphite, copper powder, and/or sodium carbonate, as non-limiting examples.

If this first method does not function due to failure of the control circuitry or damage to the leads, then capsule 217 has a casing that is also constructed of the micrometer-sized polymorph fibers that together form a heat-sensitive polymer coating. In the presence of sufficient heat, the polymorph fibers in the coating of capsule 217 will melt. With the interior of capsule 217 thus exposed to the heat, this then ignites a fuse within capsule 217, which is in communication with the explosive that is then ignited. Again in this case, the flame-retardant material is sent throughout the power storage system 200 by the explosion, thereby extinguishing the fire and preventing any further fire or electrocution hazard that results from the overheat condition.

Figure 4A:
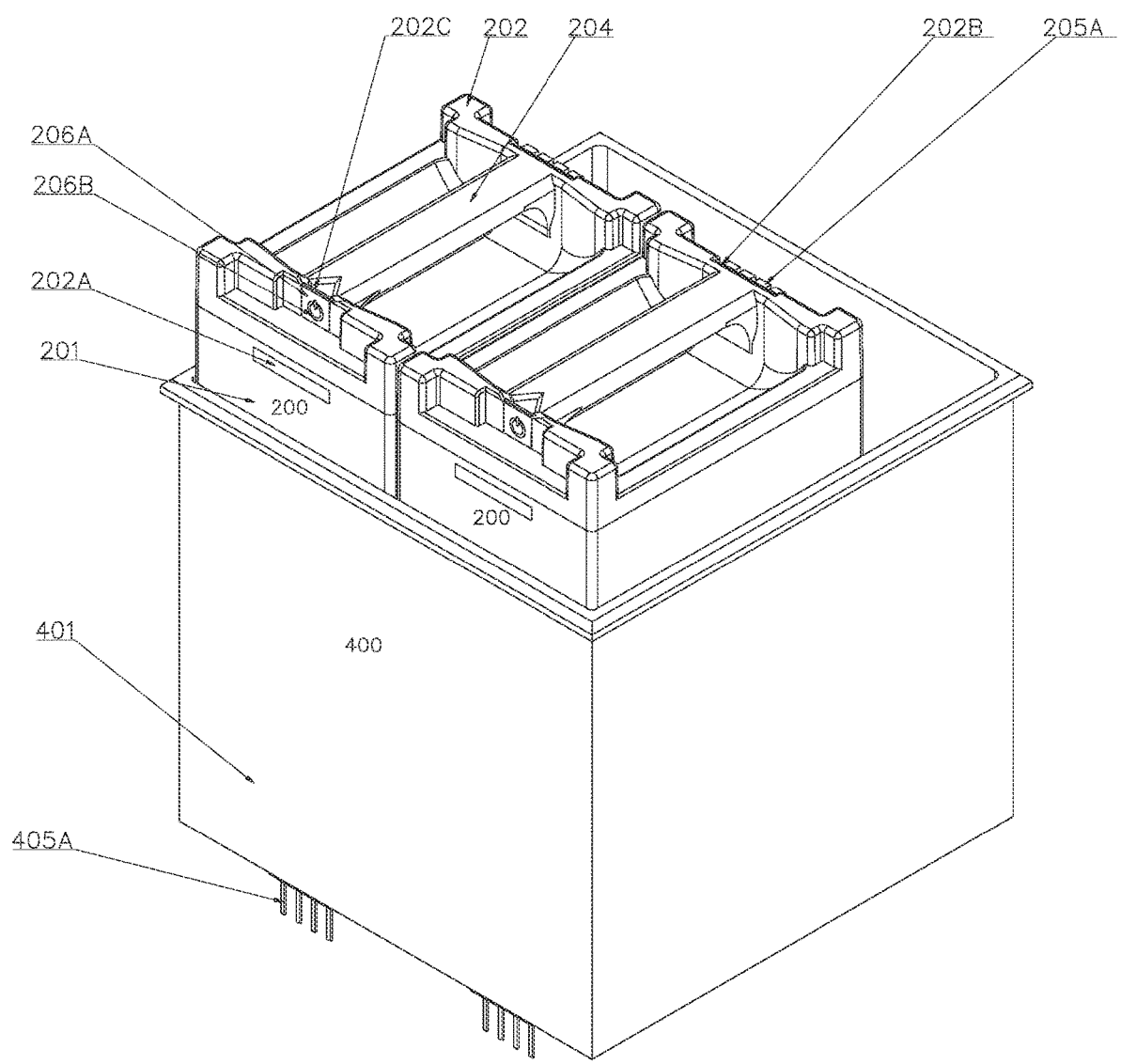
FIG. 4A is a top-down perspective view of an embodiment of an enclosure with two connected power storage systems according to an embodiment of the invention.
Figure 4B:
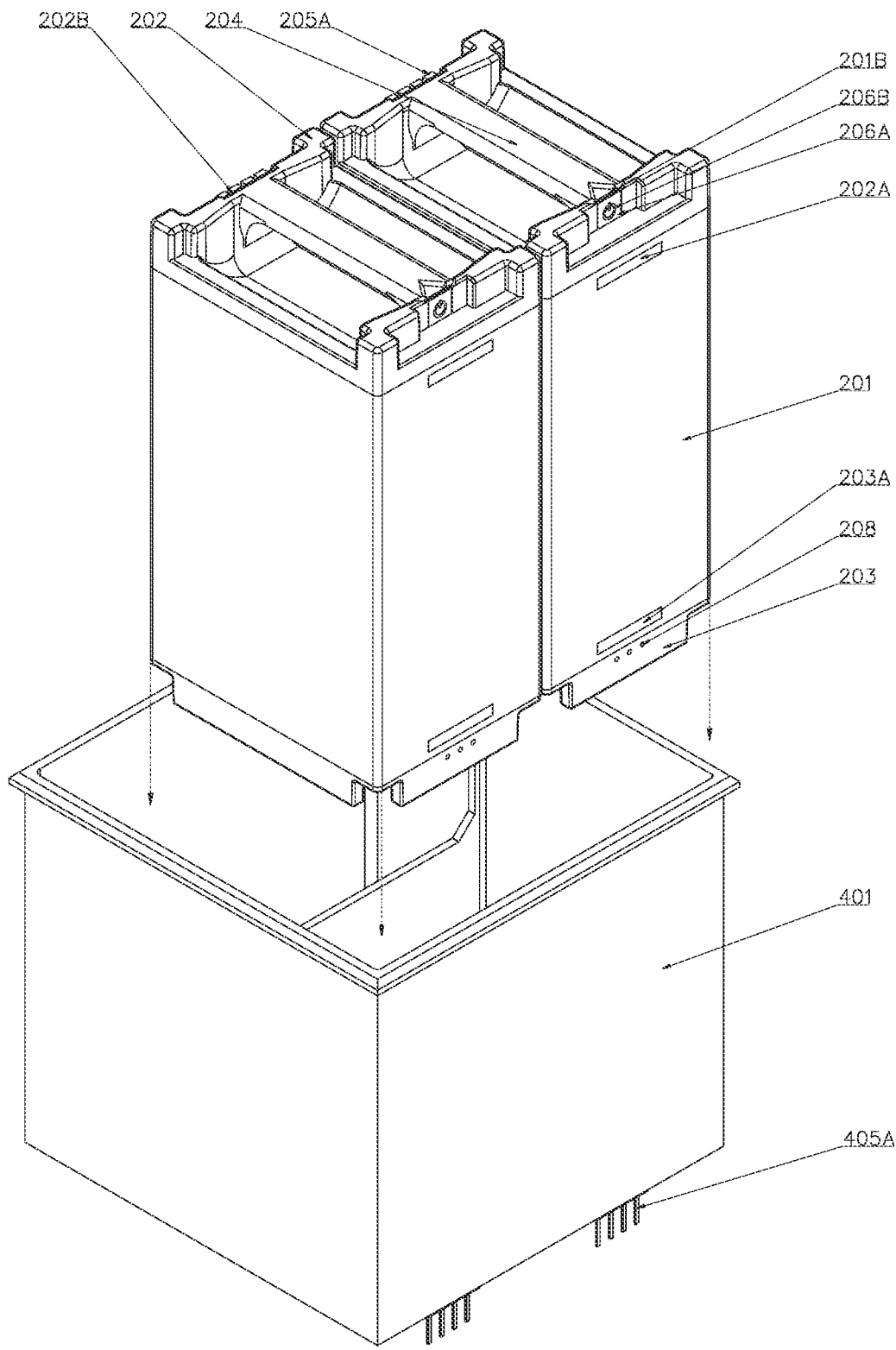
FIG. 4B is an exploded top-down perspective view of two power storage systems connecting to an enclosure according to an embodiment of the invention.
Figure 4C:
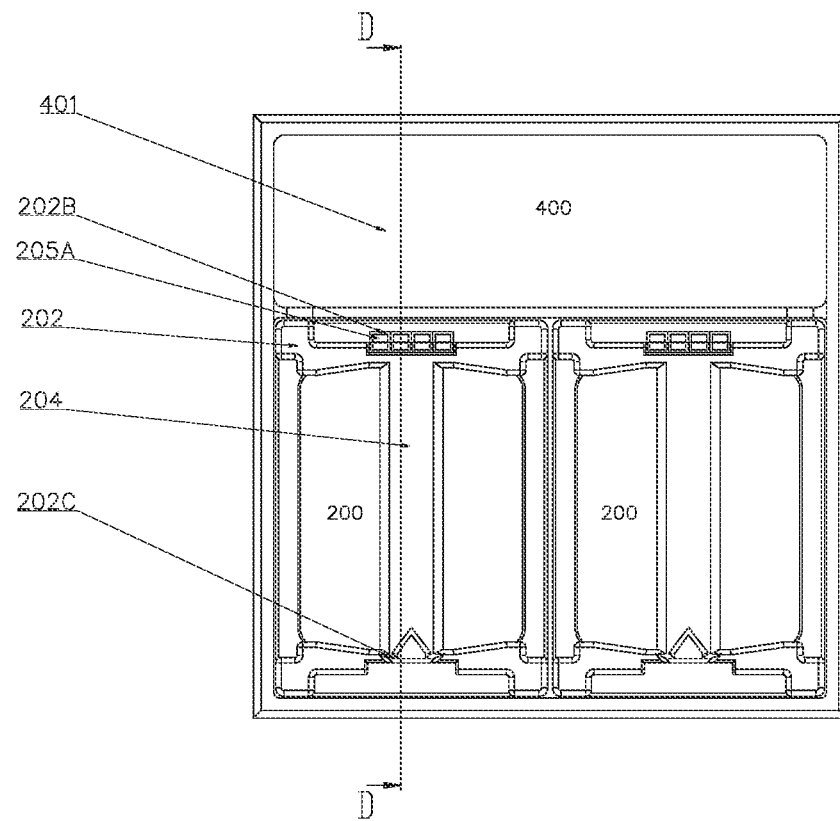
FIG. 4C is a top plan view of two power storage systems in an enclosure according to an embodiment of the invention.
Figure 4D:
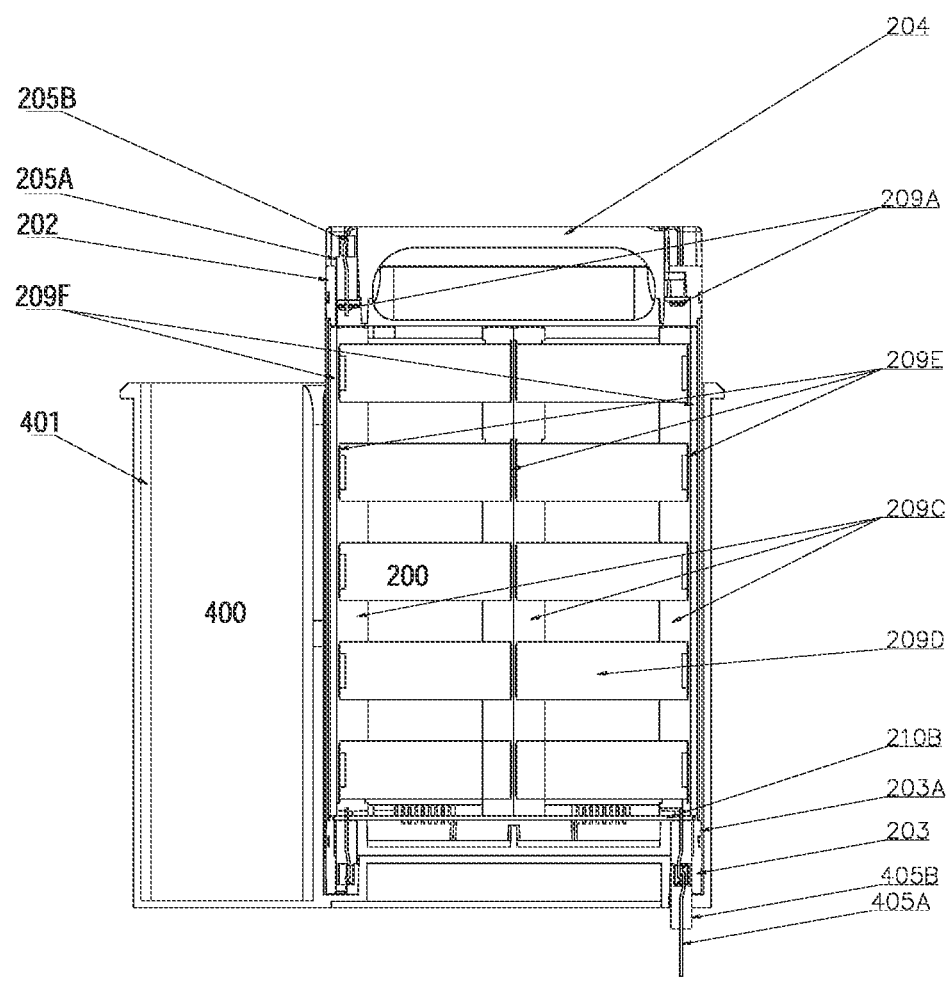
FIG. 4D is a side internal view of an embodiment of two power systems connecting to an enclosure according to an embodiment of the invention taken along section line [D-D] of FIG. 4C.

FIGS. 4A-4C illustrate one or two power storage systems 200 interconnecting with an enclosure 500. An enclosure of this type may be employed, for example, on a powered vehicle such as a moped in order to securely house power storage systems 200 while the vehicle is in motion. The high walls of enclosure 500 serve to prevent the power storage systems 200 from becoming dislodged during movement of the vehicle, and also serve to prevent any contact with the electrical connections by a conductor or the user while the system is in use.

FIGS. 5-5E illustrate a docking station 400 that allows the side-by-side mounting of up to four power storage systems 200. Alternative embodiments of docking station 400 may allow for fewer or more power storage systems 200 to dock. Docking station 400 includes a top cap 402 to receive the power storage systems 200 that fits onto terminal housing 404A. Endcaps 404B provide support for docking station 400. Electrical interconnection with power storage systems 200 occurs at receptor terminals 405A, which mate with power contacts 205B. Docking station 400 further includes secondary power switch 406C, USB ports 407, inlet 412, vent slots 414 for cooling, and outlet socket 415.

Figure 6:
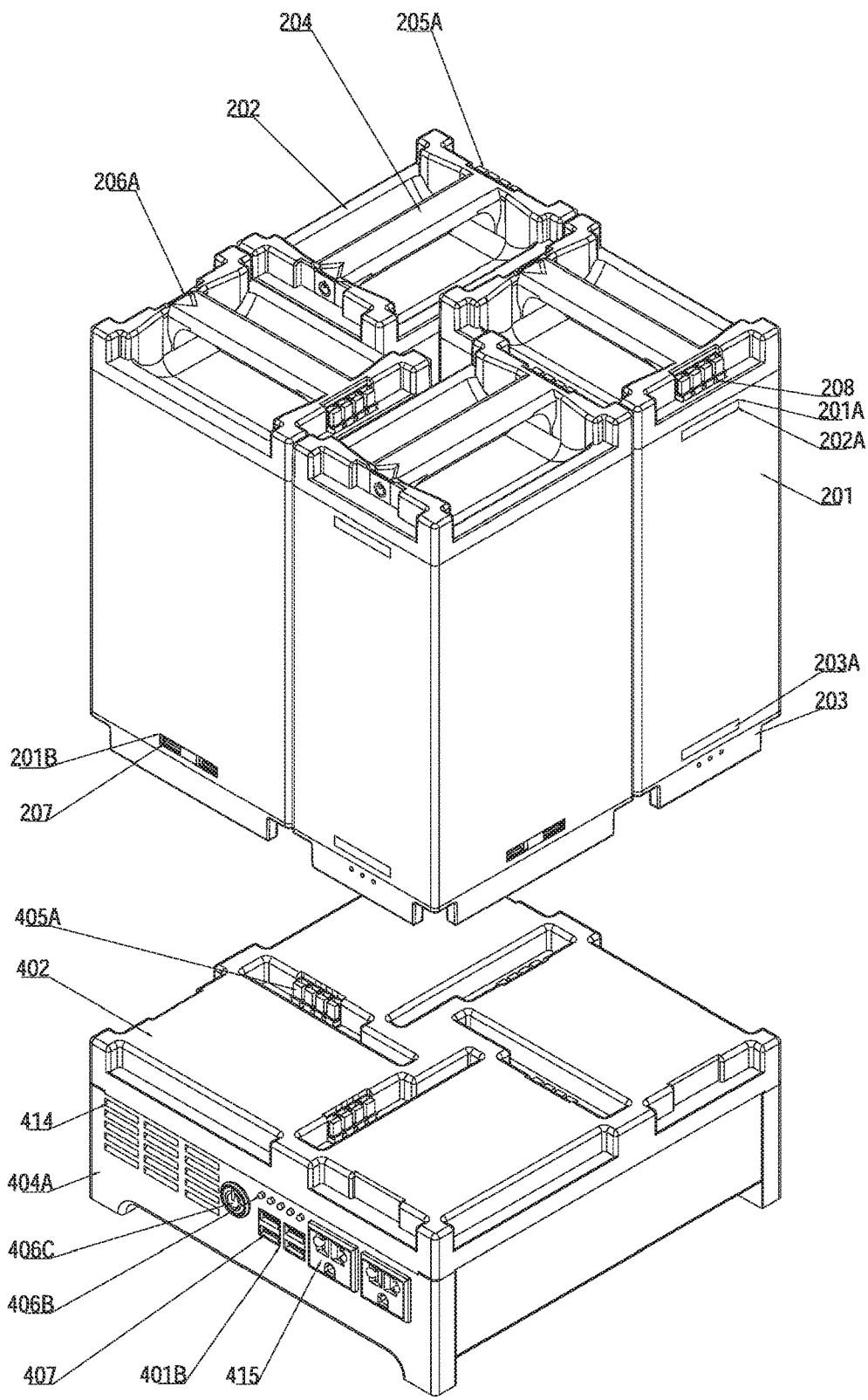
FIG. 6 is an exploded top-down perspective view of the power generation system of FIG. 5 with four interlocking power storage systems.
Figure 6A:
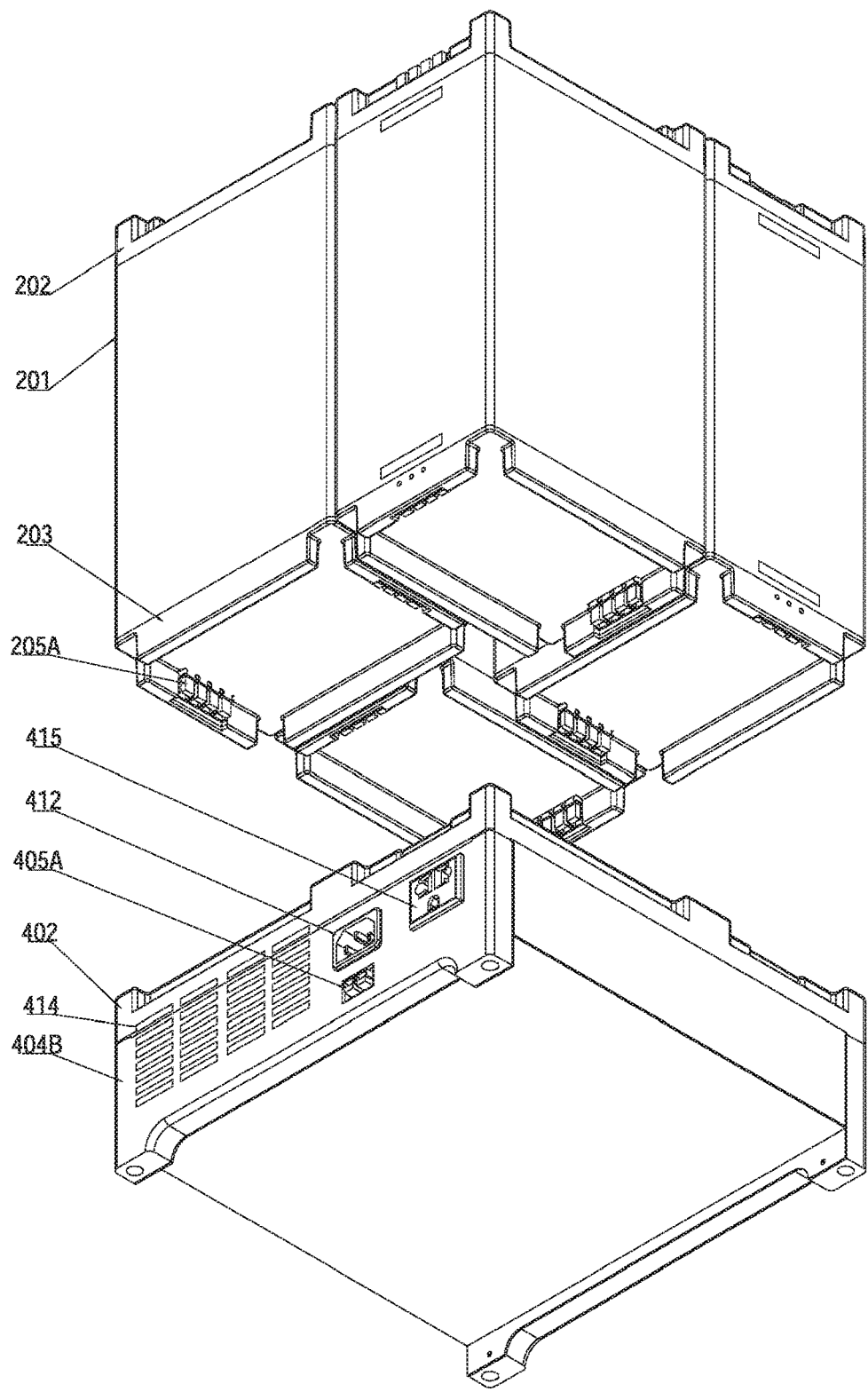
FIG. 6A is an exploded bottom-up perspective view of the power generation system and four interlocking power storage systems of FIG. 6.
Figure 6B:
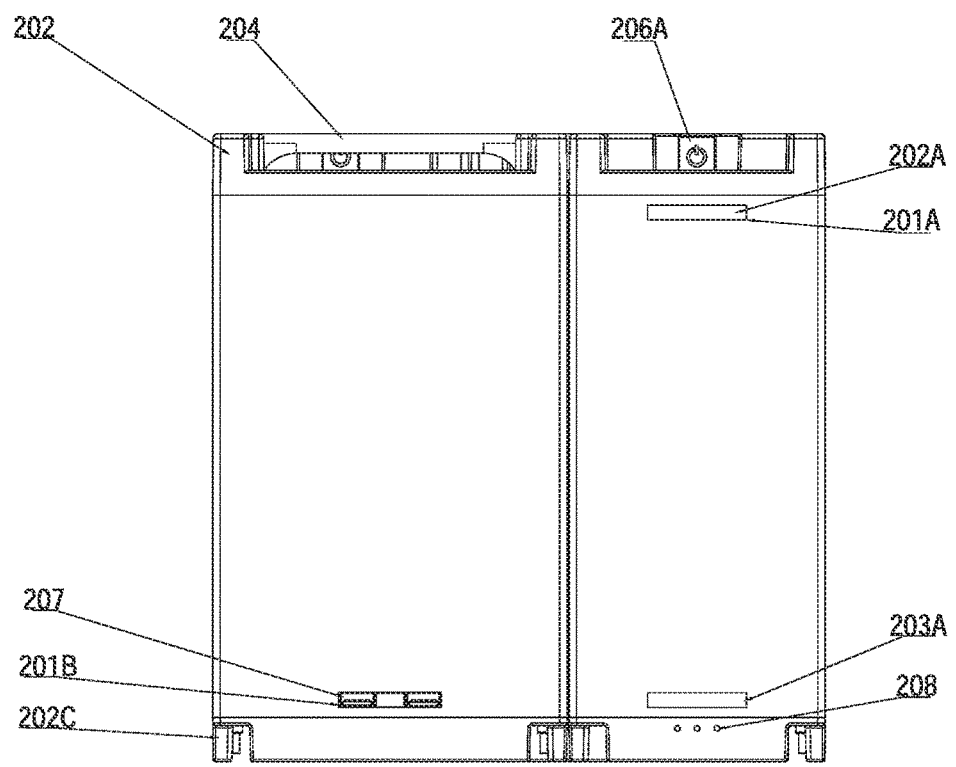
FIG. 6B is an exploded front elevational view of the power generation system and interlocking power storage systems of FIG. 6.
Figure 6B:
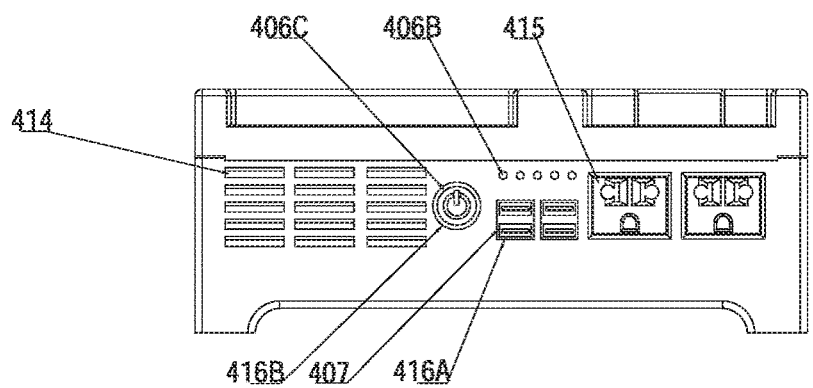
Figure 6C:
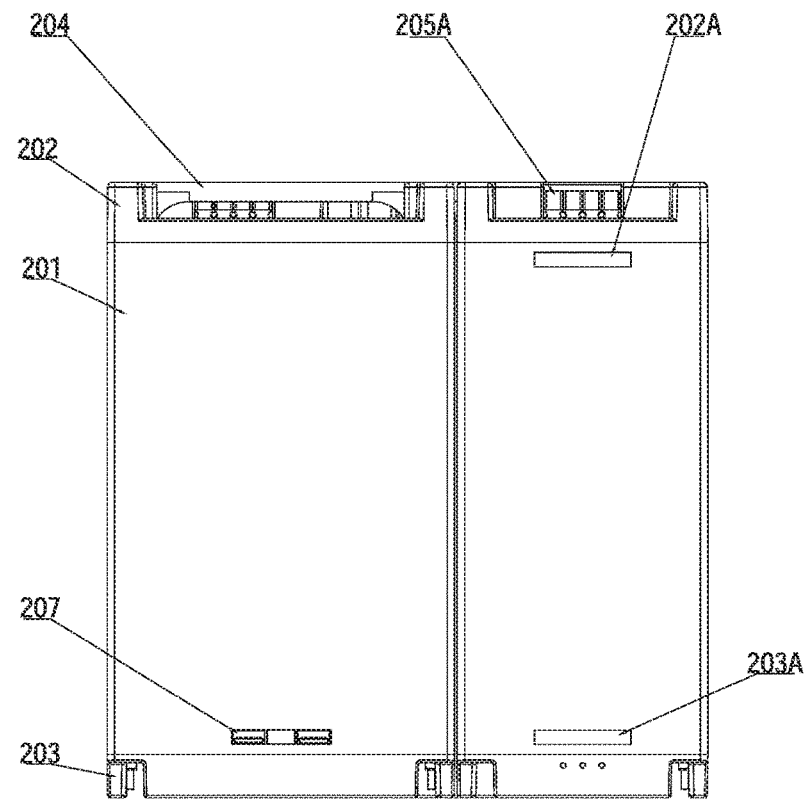
FIG. 6C is an exploded side elevational view of the power generation system and interlocking power storage systems of FIG. 6.
Figure 6C:
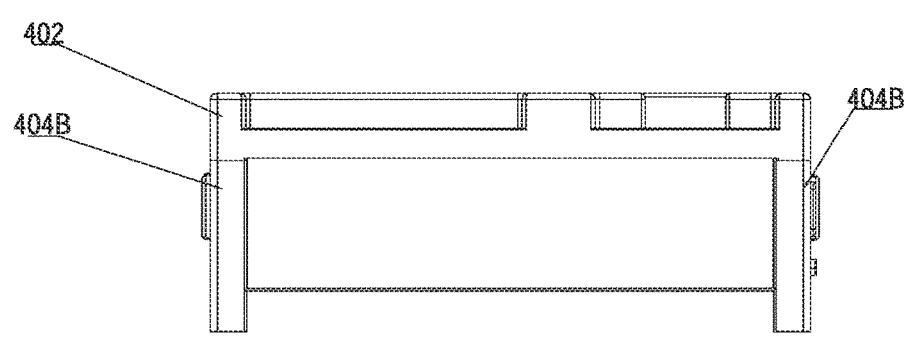
Figure 6D:
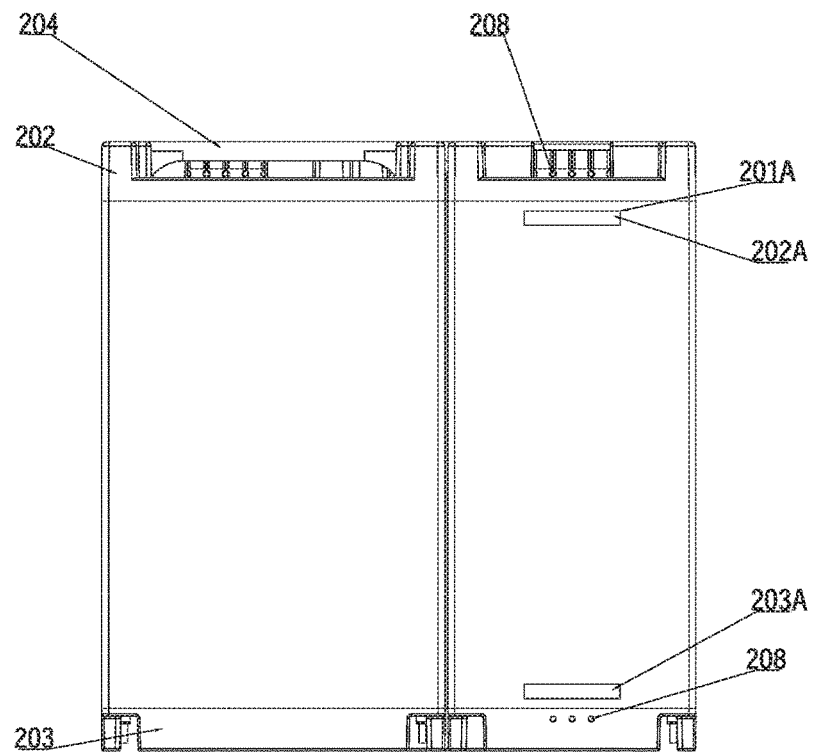
FIG. 6D is an exploded rear elevational view of the power generation system and interlocking power storage systems of FIG. 6.
Figure 6D:
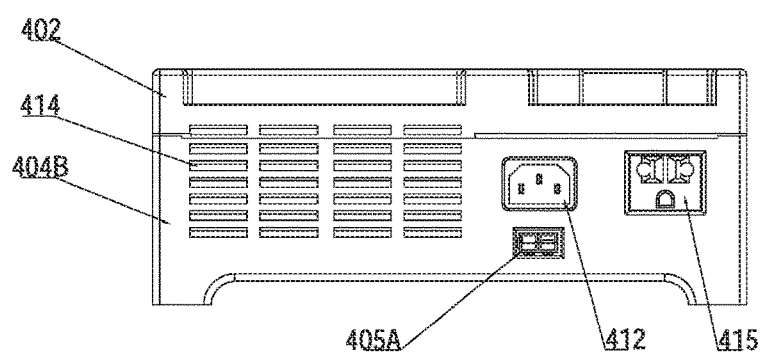
Figure 6E:
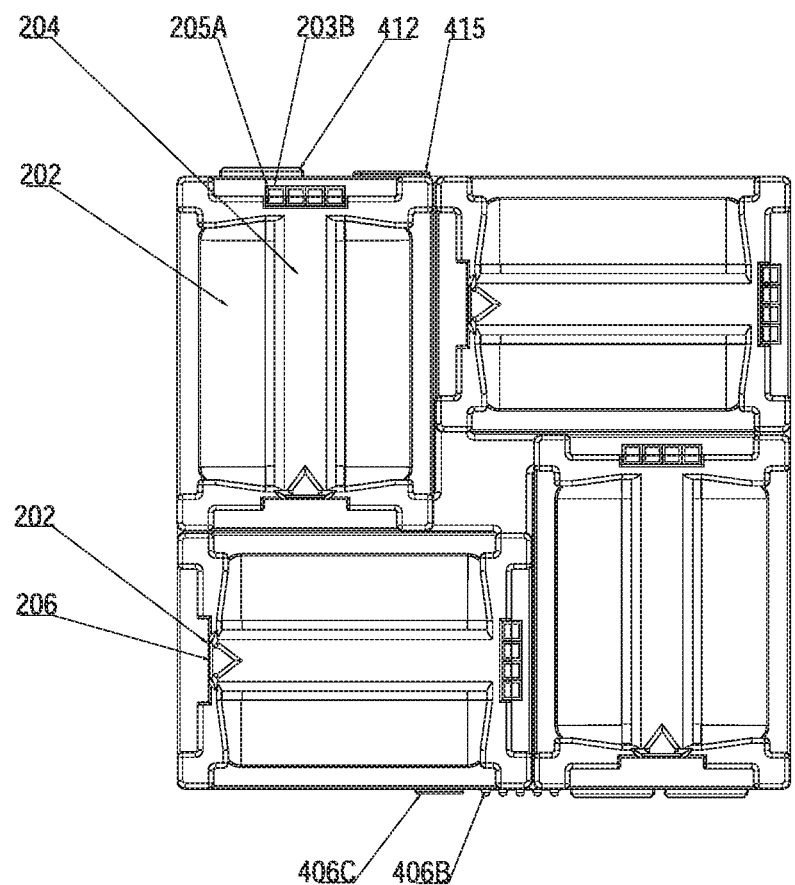
FIG. 6E is a top plan view of the power generation system and interlocking power storage systems of FIG. 6.
Figure 7:
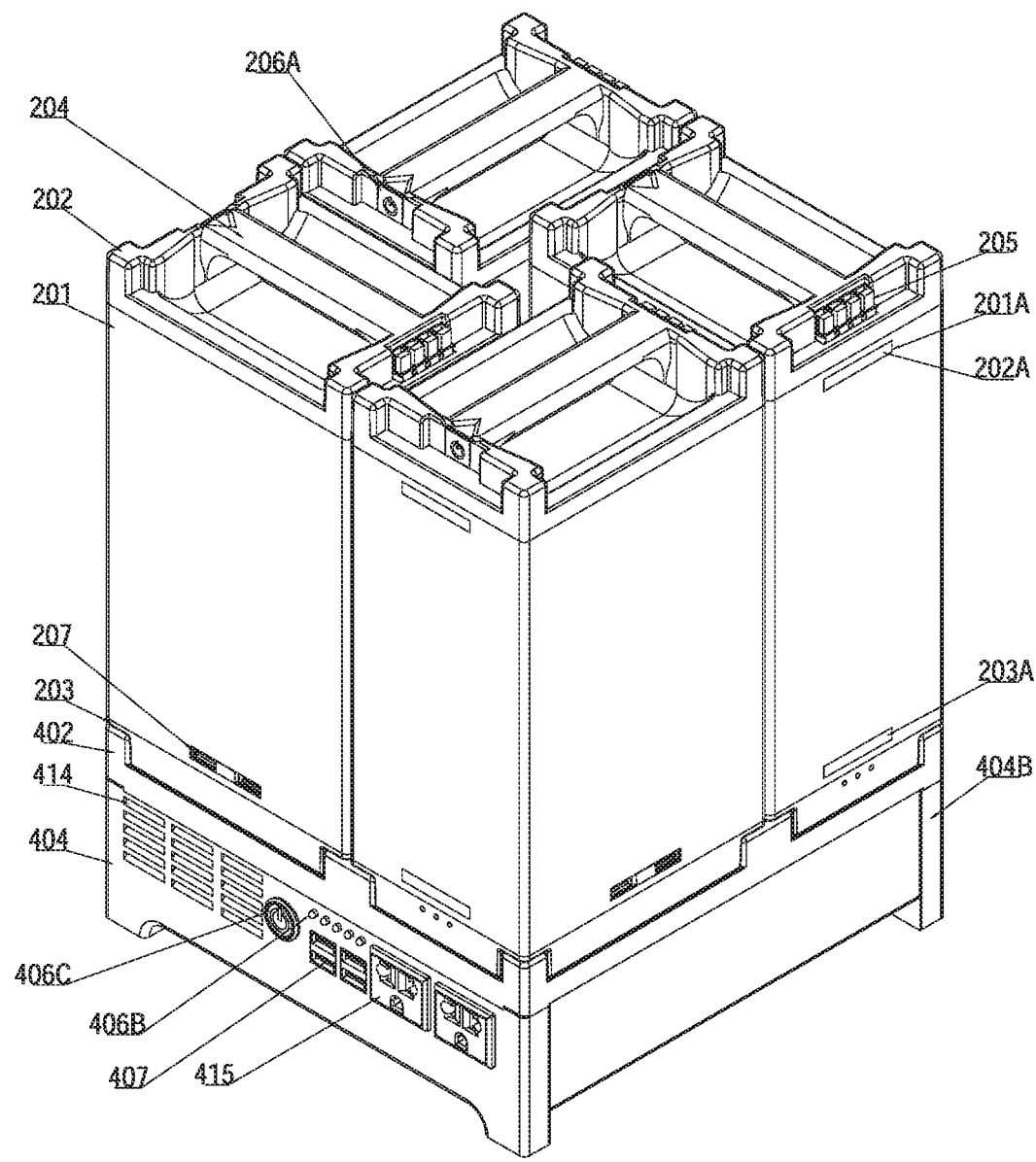
FIG. 7 is a top-down perspective view of the power generation system and interlocking power storage systems of FIG. 6.
Figure 7A:
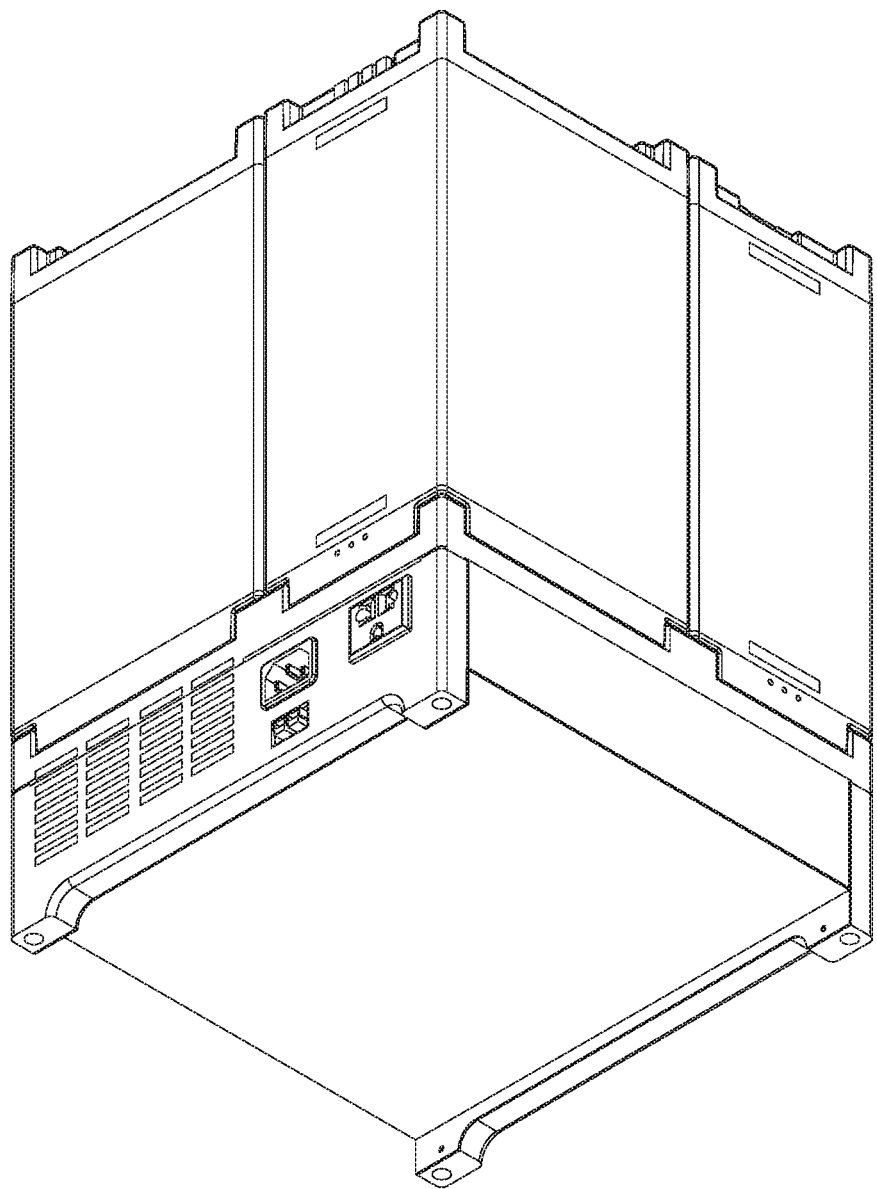
FIG. 7A is a bottom-up perspective view of the power generation system and interlocking power storage systems of FIG. 6.
Figure 7B:
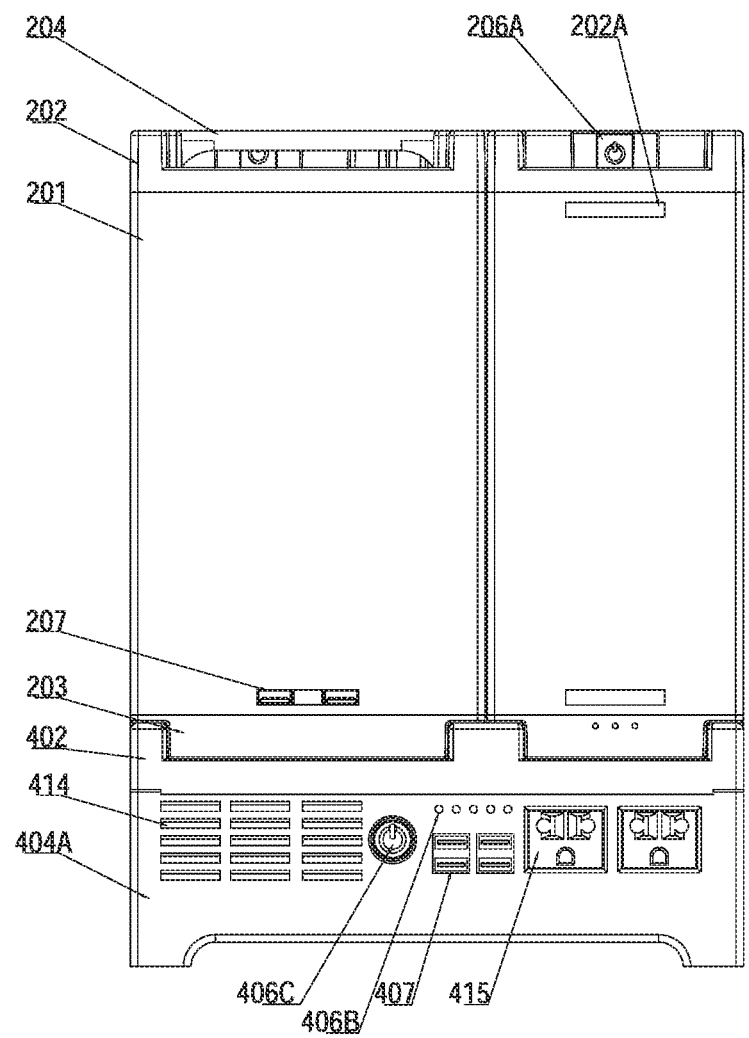
FIG. 7B is a front elevational view of the power generation system and interlocking power storage systems of FIG. 6.
Figure 8:
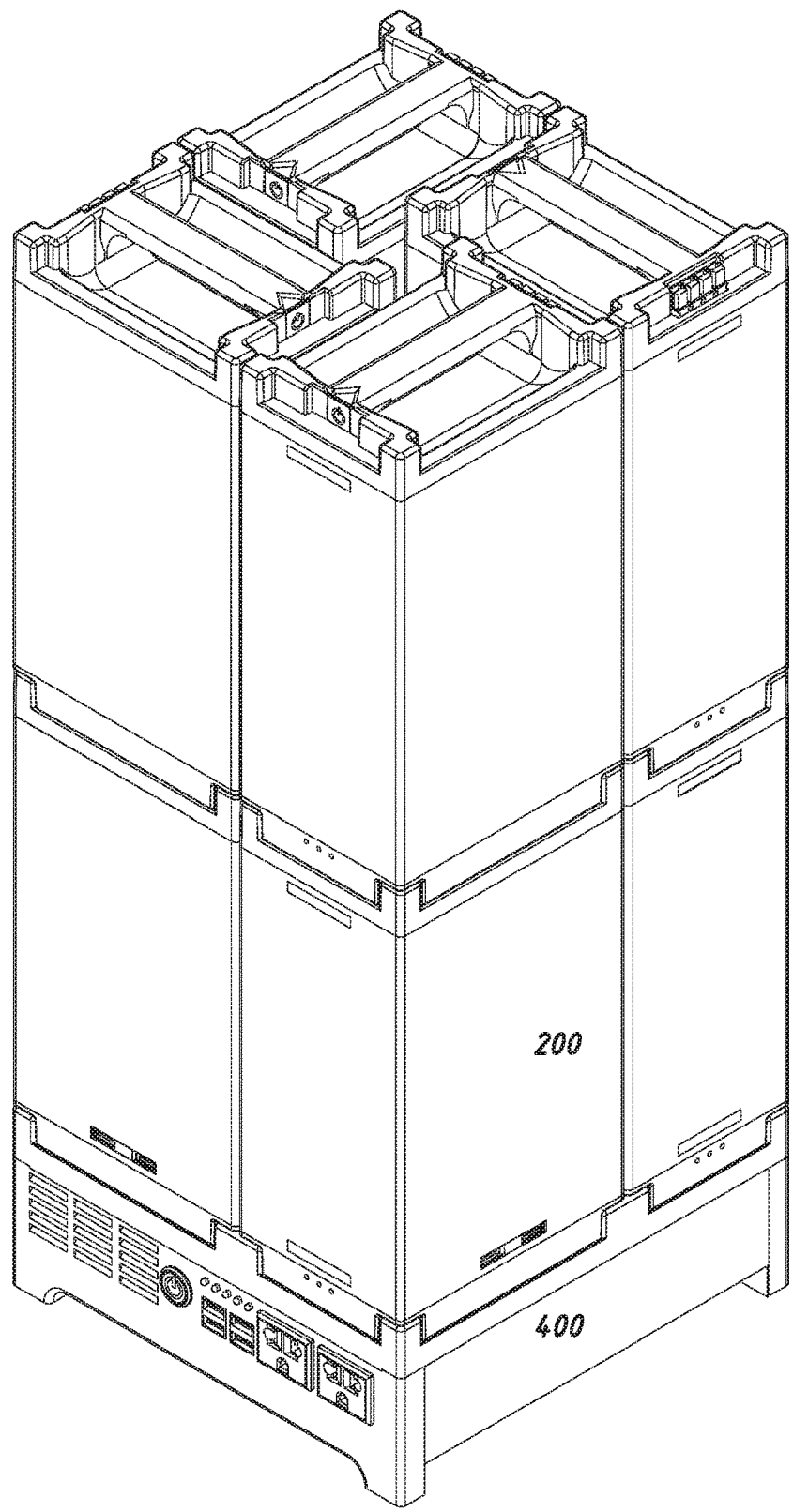
FIG. 8 is a top-down perspective view of a power generation system and eight interlocking power storage systems according to an embodiment of the invention.
Figure 8A:
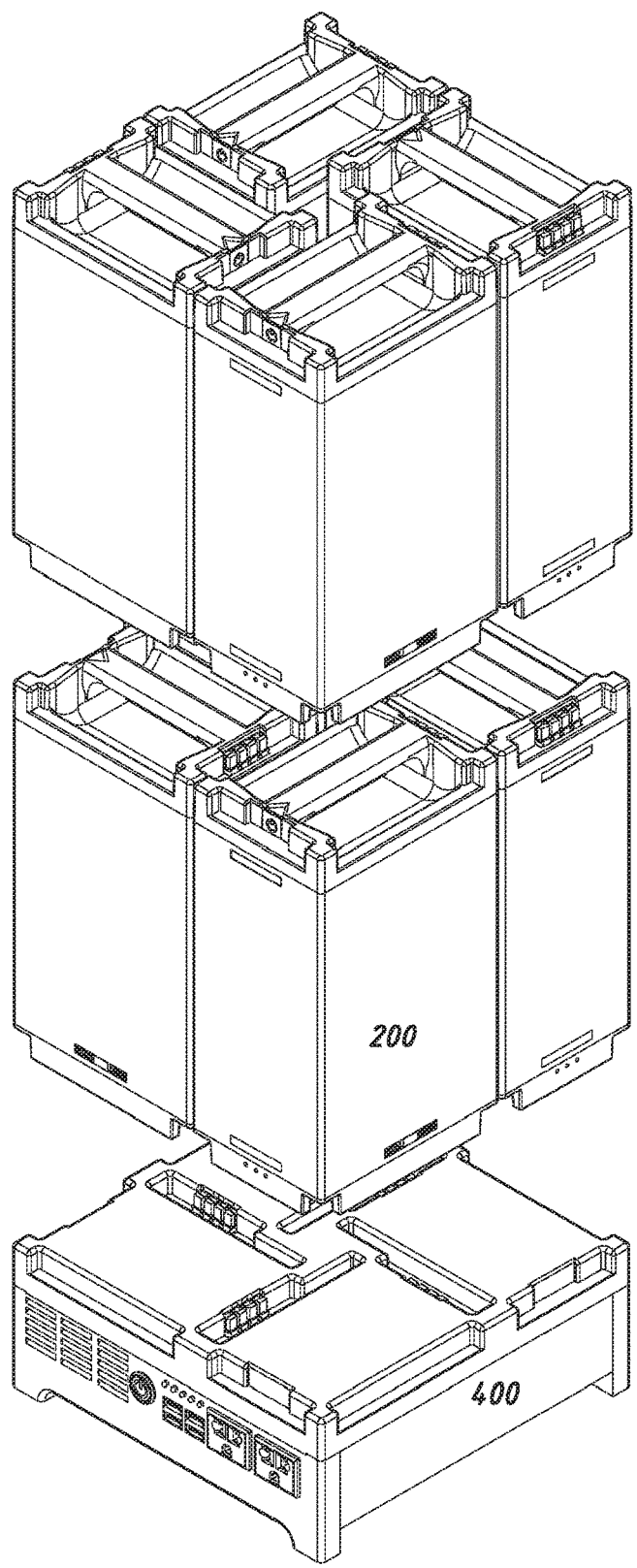
FIG. 8A is an exploded top-down perspective view of the power generation system and interlocking power storage systems of FIG. 8.
Figure 8B:
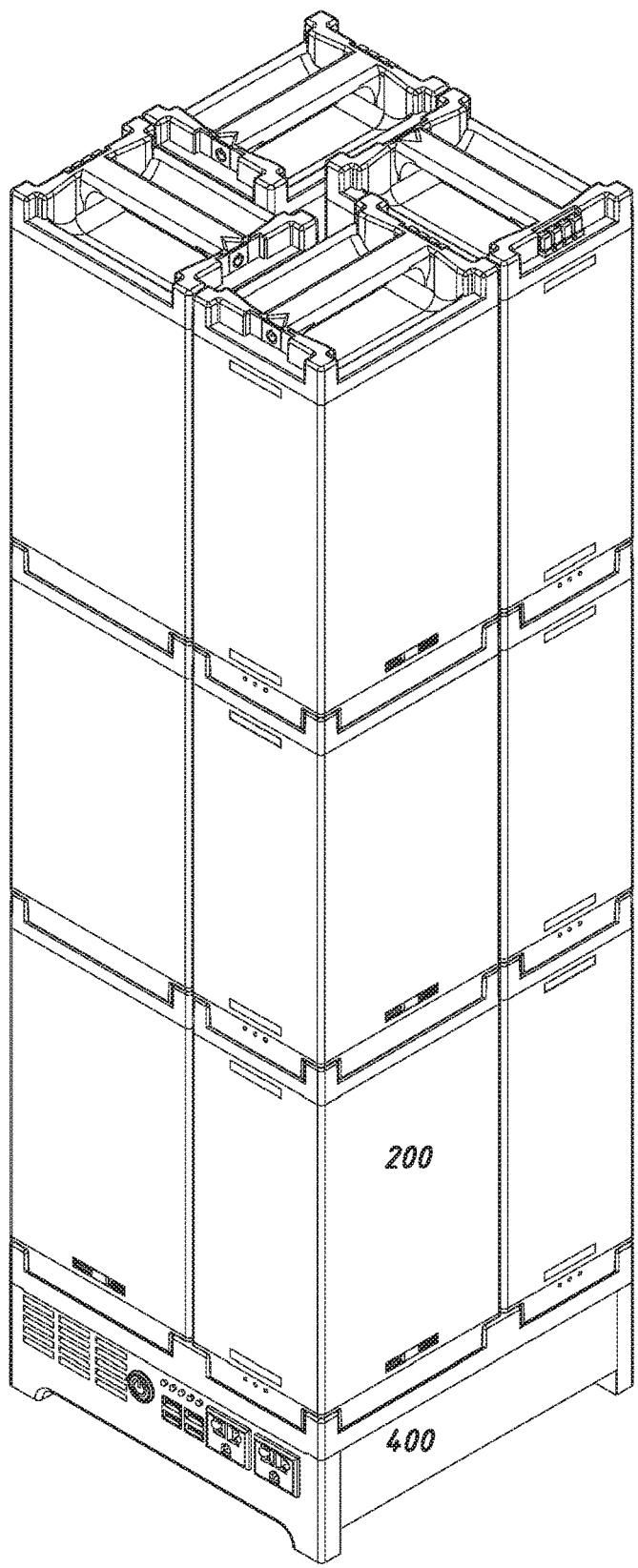
FIG. 8B is a top-down perspective view of a power generation system and twelve interlocking power storage systems according to an embodiment of the invention.
Figure 8C:
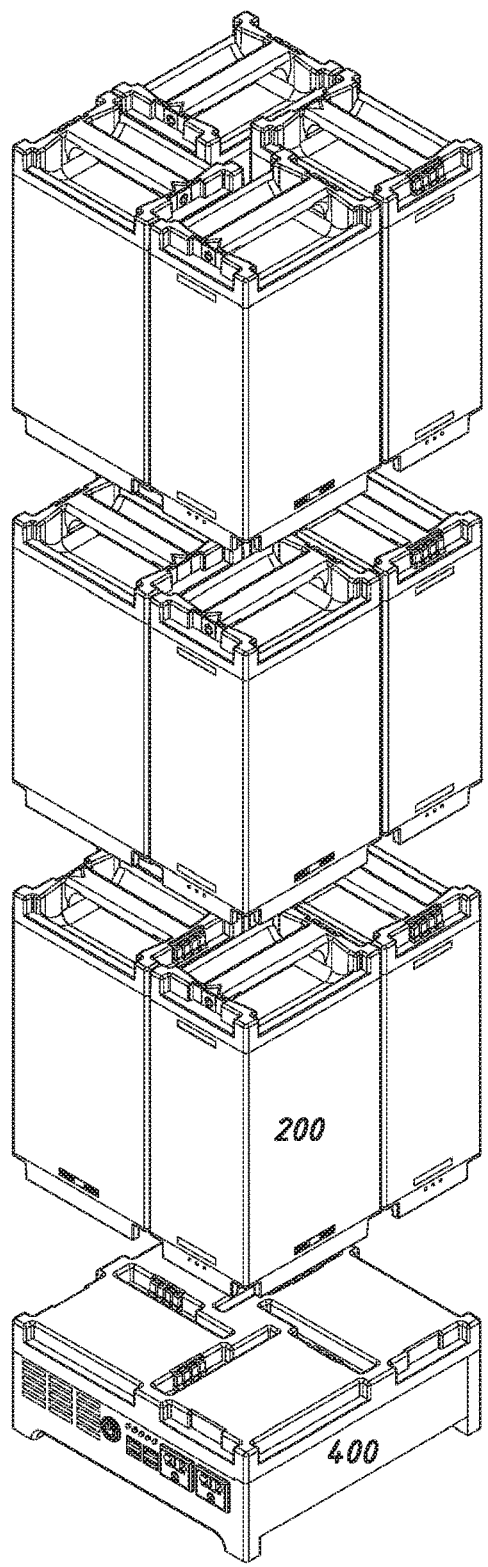
FIG. 8C is an exploded top-down perspective view of the power generation system and interlocking power storage systems of FIG. 8B.

FIGS. 6-7B illustrate a configuration with four power storage systems 200 connected directly to a docking station 400. FIGS. 8-8A illustrate a configuration with eight power storage systems 200 connected to a docking station 400, with four of the power storage systems 200 attached directly to the docking station 400, and each the other four power storage systems 200 attached at the top of one of the other four power storage systems 200. FIGS. 8B-8C show a similar configuration with twelve power storage systems 200 arranged in three layers of four each. These non-limiting examples are provided to demonstrate the flexibility of the system in terms of storage capacity and other system parameters as set forth above.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A power storage and generation system, comprising:
   a. at least one power storage system, wherein the at least one power storage system comprises:
      i. a power storage system power contact;
      ii. at least one power storage system endcap; and
      iii. a fire-retardant capsule comprising at least one fire-retardant material and an explosive positioned within the fire-retardant material such that ignition of the explosive will disperse the fire-retardant material within the at least one power system, wherein the fire-retardant capsule comprises a coating comprising a polymer with a melting temperature in the range of 55° C. to 65° C. inclusive and an igniter fuse within the coating, and
   b. at least one power generation system, wherein the at least one power generation system comprises:
      i. a power generation system power contact; and
      ii. at least one power generation system endcap,
   wherein the power storage system endcap interlocks with the power generation system endcap and the power storage system power contact is in electrical contact with the power generation system contact, further wherein the power storage system endcap and power generation system endcap when interlocked prevent contact from outside of the power storage and generation system with the power storage system power contact and the power generation system power contact.

2. The system of claim 1, wherein the at least one power storage system endcap comprises a power storage system upper endcap and a power storage system lower endcap, and wherein the at least one power generation system comprises a power generation system upper endcap and a power generation system lower endcap.

3. The system of claim 1, wherein the at least one power storage system endcap comprises a power storage system endcap recess, and further wherein the power storage system power contact is positioned within the power storage system endcap recess.

4. The system of claim 3, wherein the at least one power generation system upper endcap comprises a power generation system endcap recess, wherein the at least one power generation system lower endcap comprises a power generation system endcap tab, wherein the at least one power storage system upper endcap comprises a power storage system endcap recess, and wherein the at least one power storage system lower endcap comprises a power storage system endcap tab.

5. The system of claim 4, wherein the power generation system comprises a plurality of power generation system power contacts, wherein at least one of the plurality of power generation system power contacts is positioned on the power generation system lower endcap tab, and further wherein at least one of the plurality of power generation system power contacts is positioned in the power generation system upper endcap recess.

6. The system of claim 5, wherein the power storage system comprises a plurality of power storage system power contacts, wherein at least one of the plurality of power storage system power contacts is positioned on the power storage system lower endcap tab, and further wherein at least one of the plurality of power storage system power contacts is positioned in the power storage system upper endcap recess.

7. The system of claim 6, wherein the at least one of the plurality of power generation system power contacts positioned on the power generation system lower endcap tab is located on an inner surface of the power generation system lower endcap tab.

8. The system of claim 7, wherein the at least one of the plurality of power generation system power contacts positioned on the power generation system upper endcap recess is located within the power generation system upper endcap recess whereby such power generation system contact engages a power storage system power contact in an electrical connection when the power storage system is connected on top of the power generation system.

9. The system of claim 1, further comprising a plurality of power storage systems, each comprising a lower endcap comprising at least two tabs, and further wherein the power generation system comprises a docking station comprising a plurality of slots sized to receive at least one tab extending from the lower endcap of each of the plurality of power storage systems, and a plurality of power generation system electrical contacts, wherein at least one of the plurality of power generation system electrical contacts are located within each of the plurality of slots on the power generation system.

10. The system of claim 1, further comprising a positive and a negative terminal within the fire-retardant capsule, and a separator between the positive and negative terminal comprising a polymer with a melting temperature in the range of 55° C. to 65° C.

11. A power storage system, comprising:
a. an upper endcap comprising at least one recess;
b. a lower endcap comprising at least one tab, the at least one tab comprising an inner surface;
c. at least one electrical contact positioned inside the at least one recess;
d. at least one electrical contact positioned on the inner surface of the at least one tab; and
e. a fire-retardant capsule comprising at least one fire-retardant material and an explosive positioned within the fire-retardant material such that ignition of the explosive will disperse the fire-retardant material, wherein the fire-retardant capsule comprises a coating comprising a polymer with a melting temperature in the range of 55° C. to 65° C. inclusive and an igniter fuse within the coating.

12. The power storage system of claim 11, wherein the upper endcap comprises two recesses positioned opposite to each other and wherein the lower endcap comprises two tabs positioned opposite to each other, and wherein each of the two recesses are positioned perpendicularly to each of the two tabs.

13. The power storage system of claim 12, wherein the upper endcap comprises four recesses, wherein a first and second recess are positioned opposite and parallel to each other and a third and four recess are positioned opposite and parallel to each other and perpendicular to the first and second recesses, and further wherein the lower endcap comprises four tabs, wherein a first and second tab are positioned opposite and parallel to each other and a third and fourth tab are positioned oppose and parallel to each other and perpendicular to the first and second tabs.

14. The system of claim 11, further comprising a positive and a negative terminal within the fire-retardant capsule, and a separator between the positive and negative terminal comprising a polymer with a melting temperature in the range of 55° C. to 65° C.

* * * * *